United States Patent
Lim

(10) Patent No.: US 10,144,397 B2
(45) Date of Patent: Dec. 4, 2018

(54) METHOD OF PROVIDING STOPPED-VEHICLE MOVEMENT MODE, DRIVER ASSISTANCE APPARATUS PROVIDING THE SAME, AND VEHICLE INCLUDING DRIVER ASSISTANCE APPARATUS

(71) Applicant: LG Electronics Inc., Seoul (KR)

(72) Inventor: Jongjin Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/955,991

(22) Filed: Dec. 1, 2015

(65) Prior Publication Data

US 2017/0057475 A1 Mar. 2, 2017

(30) Foreign Application Priority Data

Sep. 2, 2015 (KR) .................. 10-2015-0124516

(51) Int. Cl.
| | |
|---|---|
| *B60T 7/22* | (2006.01) |
| *B60W 10/06* | (2006.01) |
| *B60W 10/18* | (2012.01) |
| *B60W 30/18* | (2012.01) |
| *B62D 15/02* | (2006.01) |

(52) U.S. Cl.
CPC .............. *B60T 7/22* (2013.01); *B60W 10/06* (2013.01); *B60W 10/18* (2013.01); *B60W 30/18054* (2013.01); *B62D 15/027* (2013.01); *B62D 15/0285* (2013.01)

(58) Field of Classification Search
CPC ........................................................ B60T 7/22
See application file for complete search history.

(56) References Cited

U.S. PATENT DOCUMENTS

| | | | |
|---|---|---|---|
| 9,283,960 B1* | 3/2016 | Lavoie .................. | B60W 30/06 |
| 2007/0282489 A1 | 12/2007 | Boss et al. | |
| 2012/0188100 A1* | 7/2012 | Min ........................ | G08G 1/143 |
| | | | 340/932.2 |
| 2014/0046506 A1* | 2/2014 | Reichel .............. | B62D 15/0285 |
| | | | 701/2 |
| 2014/0121883 A1* | 5/2014 | Shen .................. | B62D 15/0285 |
| | | | 701/28 |
| 2014/0214260 A1* | 7/2014 | Eckert .................... | B60Q 1/488 |
| | | | 701/28 |

(Continued)

FOREIGN PATENT DOCUMENTS

| | | |
|---|---|---|
| EP | 2316709 A2 | 5/2011 |
| JP | 2000-16187 A | 1/2000 |

(Continued)

*Primary Examiner* — Adam D Tissot
*Assistant Examiner* — Michael A Berns
(74) *Attorney, Agent, or Firm* — Birch, Stewart, Kolasch & Birch, LLP

(57) ABSTRACT

A driver assistance apparatus includes a sensor unit sensing an obstacle around a vehicle; a memory storing a stopped-vehicle movement range; a brake driving control unit turning on or off a vehicle brake; and a processor controlling the brake driving control unit to turn on or off the vehicle brake according to the obstacle around the vehicle and the stopped-vehicle movement range, wherein the processor provides a stopped-vehicle movement mode in which the vehicle moves, when a user is not in the vehicle.

27 Claims, 20 Drawing Sheets

(56) References Cited

U.S. PATENT DOCUMENTS

2016/0144857 A1* 5/2016 Ohshima ............... B60W 30/06
                                                                                    701/23

FOREIGN PATENT DOCUMENTS

| | | |
|---|---|---|
| JP | 2009-90827 A | 4/2009 |
| JP | 2011-178264 A | 9/2011 |
| JP | 2014-129082 A | 7/2014 |
| KR | 10-2006-0014189 A | 2/2006 |
| KR | 10-0917330 B1 | 9/2009 |
| KR | 10-2010-0100022 A | 9/2010 |
| KR | 10-2013-0128987 A | 11/2013 |
| KR | 10-2013-0141932 A | 12/2013 |
| KR | 10-2014-0053725 A | 5/2014 |
| KR | 10-2014-0080774 A | 7/2014 |
| KR | 10-2014-0083678 A | 7/2014 |
| KR | 10-1462926 B1 | 11/2014 |

* cited by examiner 181, 113

113

700
Parking space

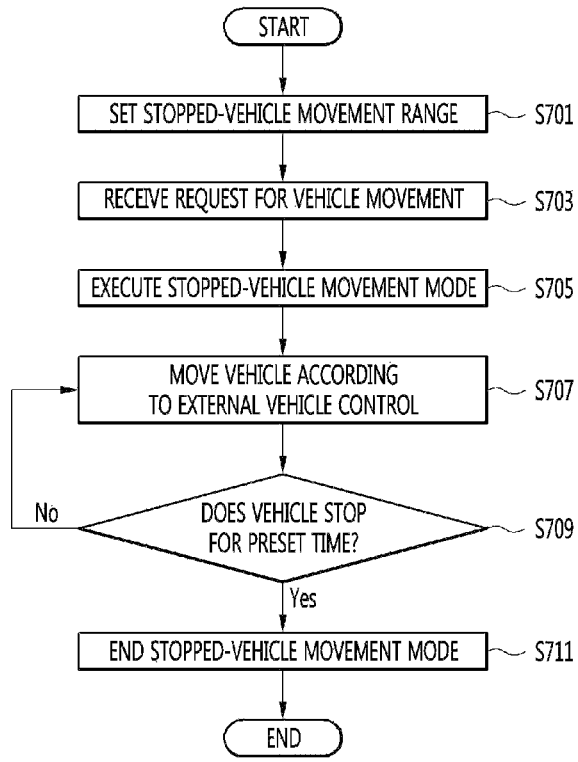

METHOD OF PROVIDING STOPPED-VEHICLE MOVEMENT MODE, DRIVER ASSISTANCE APPARATUS PROVIDING THE SAME, AND VEHICLE INCLUDING DRIVER ASSISTANCE APPARATUS

CROSS-REFERENCE TO RELATED APPLICATIONS

The present application claims priority under 35 U.S.C. 119 to Korean Patent Application No. 10-2015-0124516 filed on Sep. 2, 2015, which is hereby incorporated by reference in its entirety.

BACKGROUND

The present disclosure relates to a method of providing a stopped-vehicle movement mode for a vehicle, a driver assistance apparatus providing the same, and a vehicle including the driver assistance apparatus.

A vehicle is an apparatus that moves a user in a direction in which he or she wants to go. A representative sample of the vehicle may be a car.

For the convenience of a user who uses a vehicle, the inclusion of various sensors and electronic devices is a modern trend. In particular, various apparatuses for the driving convenience of a user are being developed.

In particular, with an increase in interest in self-driving vehicles, research on a sensor that is located on the self-driving vehicle is being actively conducted. Sensors located on the self-driving vehicle include a camera, an infrared sensor, a radar, a Global Positioning System (GPS), a Lidar, a gyroscope, and so on, among which the camera holds an important position as a sensor that performs a function of replacing a person's eye.

In addition, with the development of these various sensors and electronic equipment, a vehicle that includes a driver assistance function that assists a user in driving and enhances driving safety and convenience is receiving attention.

A driver may stop a vehicle at a undesirable position during driving, get out of the vehicle and move away from the vehicle.

In this instance, other people may experience inconvenience in that they may not be able to move their vehicles out of a parking space due to the stopped vehicle.

In addition, when other people call the driver having a number left on the stopped vehicle in order to have the stopped vehicle moved, there is inconvenience in that the driver of the stopped vehicle should come back to and move the stopped vehicle.

There are instances where a driver releases a brake, maintains the neutral gear and then leaves the stopped vehicle.

In these instances, other people need to push the stopped vehicle in order to move the vehicle, in which process there is high possibility of accident and there may be inconvenience in that other people need to push the heavy vehicle for themselves in order to move the vehicle.

SUMMARY

Embodiments provide a method of providing a stopped-vehicle movement mode, a driver assistance apparatus providing the stopped-vehicle movement mode, and a vehicle including the driver assistance apparatus.

In one embodiment, a driver assistance apparatus includes a sensor unit sensing an obstacle around a vehicle; a memory storing a stopped-vehicle movement range; a brake driving control unit turning on or off a vehicle brake; and a processor controlling the brake driving control unit to turn on or off the vehicle brake according to the obstacle around the vehicle and the stopped-vehicle movement range, wherein the processor provides a stopped-vehicle movement mode in which the vehicle moves, when a user is not in the vehicle.

In another embodiment, a method of providing a stopped-vehicle movement mode in which a vehicle moves when a user is not in the vehicle includes stopping the vehicle by activation of a vehicle brake; setting a stopped-vehicle movement range; releasing the vehicle brake when the stopped-vehicle movement mode is executed; sensing the vehicle movement and activating the vehicle brake when a position of the vehicle gets out of the stopped-vehicle movement range; and sensing an obstacle from a movement direction of the vehicle and activating the vehicle brake when the obstacle is sensed.

A further embodiment provides a vehicle including the driver assistance apparatus.

The details of one or more embodiments are set forth in the accompanying drawings and the description below.

Other features will be apparent from the description and drawings, and from the claims.

BRIEF DESCRIPTION OF THE DRAWINGS

FIG. 29 is a flowchart of the method of moving a vehicle by using a stopped-vehicle movement mode according to another embodiment.

FIGS. 30 and 31 are diagrams for explaining FIG. 29.

DETAILED DESCRIPTION OF THE EMBODIMENTS

Figure 1:
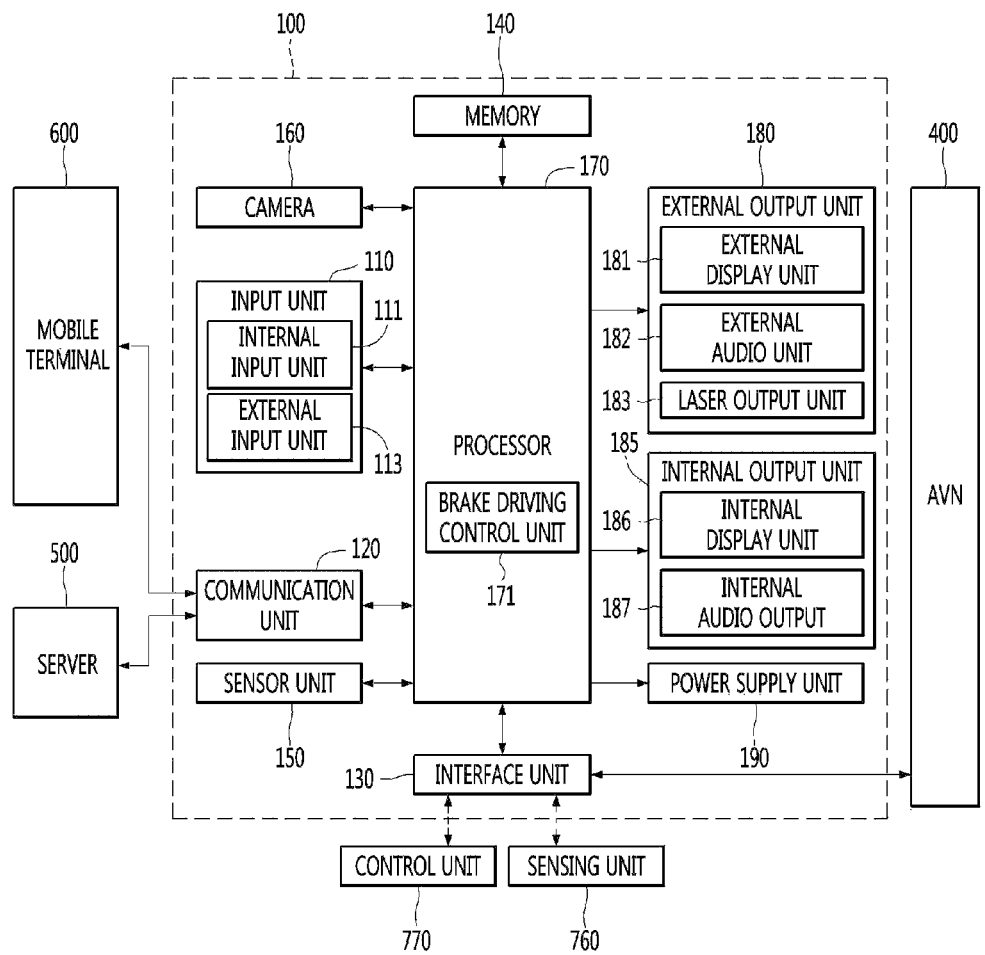
FIG. 1 represents a block diagram of a driver assistance apparatus according to an embodiment.

Hereinafter, embodiments are described in detail with reference to the accompanying drawings and regardless of the numbers of the drawings, same or similar components are assigned with the same reference numerals and thus repetitive descriptions for those are omitted. Since the suffixes "module" and "unit" for components used in the following description are given and interchanged for easiness in making the present disclosure, they do not have distinct meanings or functions. In describing the embodiments disclosed in the present disclosure, detailed descriptions of related known technologies will be omitted because they would obscure the subject of the embodiments disclosed in the present disclosure. Also, the accompanying drawings are used to help easily understanding embodiments disclosed herein but the technical idea disclosed in the present disclosure is not limited thereto. It should be understood that all of variations, equivalents or substitutes contained in the concept and technical scope of the inventive concept are also included.

Although the terms 'first' and 'second' may be used to describe various components, these components should not be limited to these terms. The terms are used only in order to distinguish a component from another component.

When it is mentioned that any component is "connected" or "accessed" to another component, it should be understood that the former can be directly connected to the latter, or there may be another component in between. On the contrary, when any component is referred to as being 'directly connected' or 'directly accessed' to another component, it should be understood that there may be no other component in between.

The terms in singular form include the plural form unless otherwise specified.

It should be understood that the term "includes" or "has" indicates the presence of characteristics, numbers, steps, operations, components, parts or combinations thereof represented in the present disclosure but does not exclude the presence or addition of one or more other characteristics, numbers, steps, operations, components, parts or combinations thereof.

A vehicle discussed in the present disclosure may include a car or motorcycle. In the following, the car of the vehicle is mostly discussed.

The vehicle discussed in the present disclosure may include all of an internal combustion engine vehicle that includes an engine as a power source, a hybrid vehicle that includes an engine and an electrical motor as a power source, and an electrical vehicle that includes an electrical motor as a power source.

In the following description, the left side of the vehicle means the left side of the driving direction of the vehicle and the right side of the vehicle means the right side of the driving direction of the vehicle.

A vehicle mentioned in the specification is a vehicle that may provide an advanced driver assistance system (ADAS) and a self-driving function. For example, the vehicle may provide a blind spot detection (BSD) function, a lane keeping assist system (LKAS), a lane departure warning system (LDWS), an autonomous emergency braking (AEB) function, etc.

In the following description, the left of the vehicle means the left of the driving direction of the vehicle and the right of the vehicle means the right of the driving direction of the vehicle.

In the following description, a left hand drive (LHD) vehicle is mostly described unless mentioned to the contrary.

In the following, a driver assistance apparatus that provides a stopped-vehicle movement mode is described with reference to FIGS. 1 to 22.

Firstly, a vehicle 700 may include wheels 13FL, 13FR, 13RL, and 13RR that rotate by a power source, driving manipulation means 721A to 721D for controlling the driving of the vehicle, and a driver assistance apparatus 100 that provides a stopped-vehicle movement mode.

After a user stops the vehicle 700, the user/other people may need to move the vehicle of the user. The stopped-vehicle movement mode means a function of moving the vehicle 700 according to the control of the other people or the user outside the vehicle 700 when the user is not in the vehicle.

The driver assistance apparatus 100 providing such a stopped-vehicle movement mode is a separate apparatus in the vehicle 700 and may provide the stopped-vehicle movement mode, transmitting and receiving necessary information through data communication with the vehicle 700.

Alternatively, it is also possible to define some of the units of the vehicle 700 as the driver assistance apparatus 100.

When the driver assistance apparatus 100 is the separate apparatus, some of the units of the driver assistance apparatus 100 shown in FIG. 1 may not directly be included in the driver assistance apparatus 100 but may be units of the vehicle 700 or another apparatus loaded in the vehicle 700. By transmitting and receiving data through an interface unit 130 of the driver assistance apparatus 100, these units may be understood to be included in the driver assistance apparatus 100.

In the following description, the driver assistance apparatus 100 is described to directly include the units shown in the driver assistance apparatus 100 in FIG. 1.

Referring to FIG. 1, such a driver assistance apparatus 100 may include an input unit 110, a communication unit (communicator) 120, the interface unit 130, a memory 140, a sensor unit (sensor) 150, a camera 160, a processor 170, an external output unit (external output) 180, an internal output unit 185, and a power supply unit 190.

Firstly, the driver assistance apparatus 100 may include an input unit 110 that senses an input, and the input unit 110 may include an internal input unit (internal input) 111 that senses an input inside the vehicle and an external input unit (external input) 113 that senses an input outside the vehicle.

Specifically, a user may set a stopped-vehicle movement mode through the internal input unit 111 or turn on/off the driver assistance apparatus 100.

Figure 3:
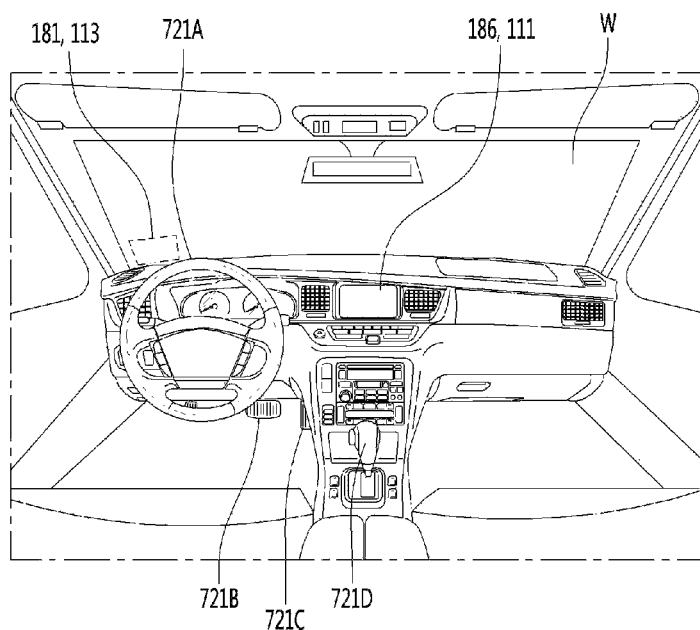
FIG. 3 is a diagram showing the interior of a vehicle that includes a driver assistance apparatus according to an embodiment.

Such an internal input unit 111 may include at least one of a gesture input unit that senses a user gesture, a touch input unit that senses a touch, and a microphone that senses a voice input, and thus sense a user input. For example, as shown in FIG. 3, the internal input unit 111 may be combined with the internal display unit 186 as the touch input so that a touch screen 186, 111 is implemented.

The user may execute the driver assistance apparatus 100 through the internal input unit 111 before getting off the vehicle.

For example, when the user parks the vehicle at one side of another previously parked vehicle in parallel thereto due to a lack of parking space, it may be difficult to move the previously parked vehicle due to the vehicle of the user (hereinafter, referred to as a 'stopped vehicle'). When the user stops the vehicle in this way and then determines that there is a need to move the stopped vehicle 700, it is possible to execute the driver assistance apparatus 100 through the internal input unit 111 before getting off the vehicle. Alternatively, it is also possible to execute the driver assistance apparatus 100 remotely through the communication unit 120 after exiting the vehicle.

Also, the user may perform settings required for execution of the stopped-vehicle movement mode through the internal input unit 111. For example, the user may designate a stopped-vehicle movement range. In this example, the stopped-vehicle movement range means a range within which other people and/or the user may move the stopped vehicle 700 in the stopped-vehicle movement mode.

Specifically, referring to FIG. 3, the user may set the stopped-vehicle movement range by displaying map information including the stopped vehicle 700 on the internal display unit 186 and designating the stopped-vehicle movement range on a map through the touch input unit on the internal display unit 186.

Alternatively, the user may set the stopped-vehicle movement range by moving the stopped vehicle 700 and designating a front movement limit line and a rear movement limit line. Specifically, the user may set the stopped-vehicle movement range by moving the stopped vehicle 700 to a front movement acceptance position and then designating a corresponding position as the front movement limit line and moving the stopped vehicle to a backward movement acceptance position and then designating a corresponding position as the rear movement limit line.

Also, the driver assistance apparatus 100 may include the internal output unit 185 that outputs such stopped-vehicle movement mode related information inside the vehicle. In addition, the internal output unit 185 may include the internal display unit 186 and an internal audio output unit 187.

Specifically, the internal display unit 186 may project and display an image onto the windshield W of the vehicle. That is, the internal display unit 186 may include a projection module projecting an image onto the windshield W, as a head up display (HUD).

Also, the internal display unit 186 may be separately installed inside the vehicle to display an image. Specifically, the internal display unit 186 may be the display of a vehicle navigation apparatus or the front cluster inside the vehicle.

Also, the internal display unit 186 may include at least one of a liquid crystal display (LCD), a thin film transistor-liquid crystal display (TFT LCD), an organic light-emitting diode (OLED), a flexible display, a 3D display, and an e-ink display.

Such an internal display unit 186 may be combined with the touch input unit to form a touch screen.

A user may perform settings required for the stopped-vehicle movement mode through the touch screen and check related information. For example, map information including the stopped vehicle 700 may be displayed on the touch screen and the user may designate the stopped-vehicle movement range on a map through a touch to set the stopped-vehicle movement range.

Also, the driver assistance apparatus 100 may include the external output unit 180 that outputs stopped-vehicle movement information to the outside of the vehicle, and the external output unit 180 may include at least one of an external display unit (external display) 181, an external audio output unit (external audio output) 182 and a laser output unit (laser) 183.

In this example, the stopped-vehicle movement information means information related to the stopped-vehicle movement mode for moving the stopped vehicle.

For example, the stopped-vehicle movement information may include a notification of the execution of the stopped-vehicle movement mode, the stopped-vehicle movement range within which the vehicle may move, a notification of who is responsible for vehicle movement, a map including the stopped vehicle, a vehicle's external control movement key, a stopped vehicle 700 around view monitor image and user call information.

Specifically, when other people and/or the user wants to move the stopped vehicle 700 outside, an interface for executing the stopped-vehicle movement mode and controlling the movement of the stopped vehicle 700 in the stopped-vehicle movement mode may be output through the external output unit 180.

Figure 6:
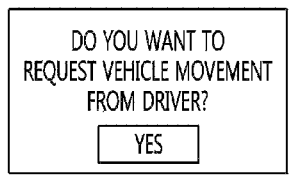
FIG. 6 represents how stopped-vehicle movement information is displayed on an external display unit according to an embodiment.

For example, an image that includes a stopped-vehicle movement mode execution notification message and an execution input interface as shown in FIG. 6 may be displayed on the external display unit 181. In this instance, the user who is outside the vehicle may see the external display unit 181 and perform an input operation of executing the stopped-vehicle movement mode through the external input unit 113 on the external display 181.

Also, the driver assistance apparatus 100 may further include the external input unit 113 that senses an external input. Such an external input unit 113 may include at least one of a button that senses a touch input, a touch input unit that senses a touch, and a microphone that senses a voice input, and thus sense an input outside a vehicle.

For example, the user may perform an input to execute the stopped-vehicle movement mode through the external input unit 113, an input to control the movement of the stopped vehicle 700, an input to request for the change of the stopped-vehicle movement range and an input to request for a call with a user terminal.

In the following, the external input unit 113 and the external output unit 180 are described together.

Specifically, the external output unit 180 may include the external display unit 181 that displays such stopped-vehicle movement information outside the vehicle and the external display unit 181 may be disposed along with the external input unit 113. For example, the external display unit 181 and the touch input unit of the external input unit 113 may be combined so that an external touch screen 181, 113 is implemented.

Figure 2:
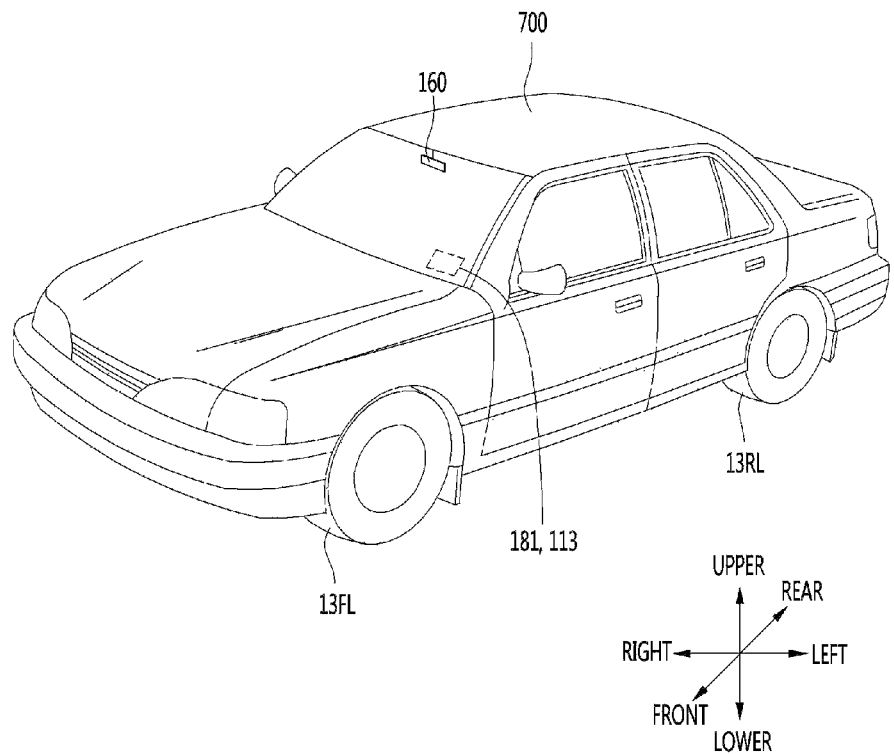
FIG. 2 is a diagram showing the interior of a vehicle that includes a driver assistance apparatus according to an embodiment.
Figure 4:
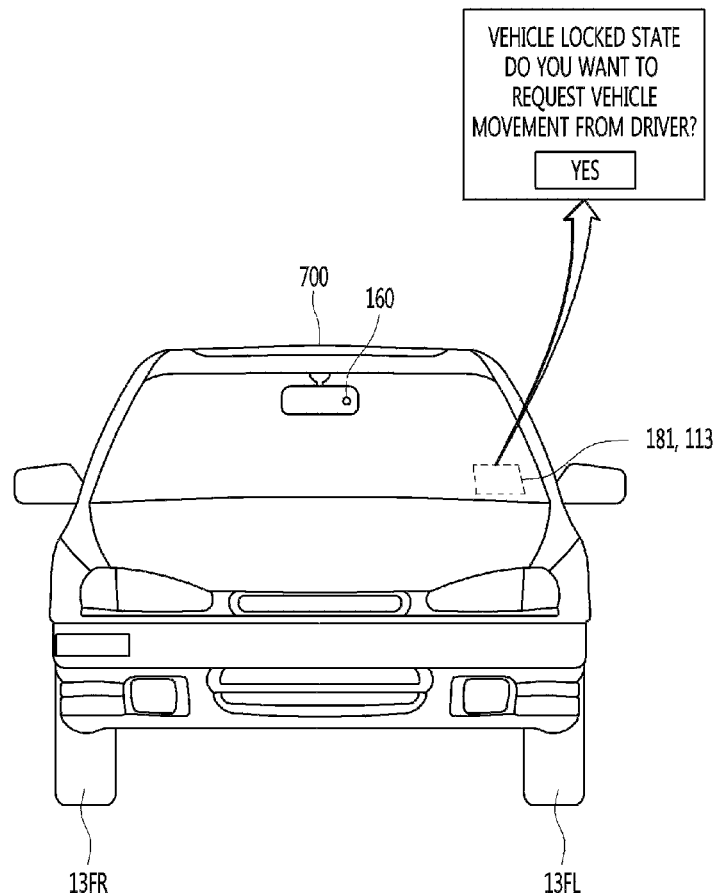
FIG. 4 is a diagram showing the front of a vehicle that includes a driver assistance apparatus according to an embodiment.
Figure 5:
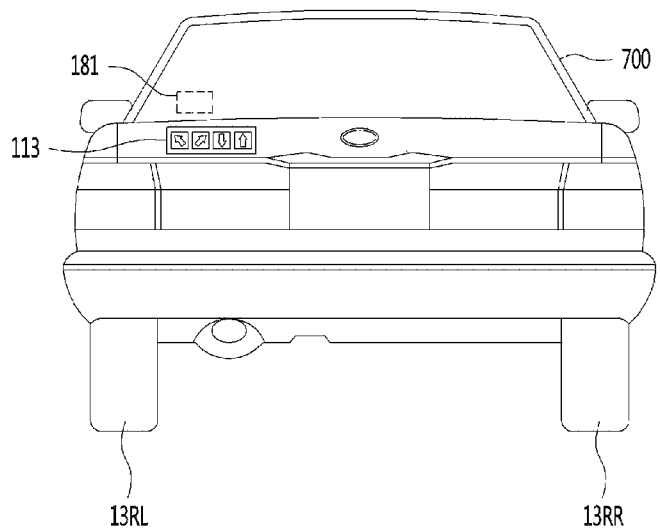
FIG. 5 is a diagram showing the rear of a vehicle that includes a driver assistance apparatus according to an embodiment.

Referring to FIGS. 2 to 4, such an external display unit 181 may display an image on the front windshield W of the vehicle. Since other people generally check user information through the windshield W of the vehicle, it is possible to display the stopped-vehicle movement information on the front windshield W.

Since the external input unit 113 is disposed on the external display unit 181, it is possible to provide a stopped-vehicle movement mode graphic interface. For example, the state of the stopped vehicle 700 and a stopped-vehicle movement mode execution notification may be displayed as shown in FIG. 4 and other people may execute the stopped-vehicle movement mode by using a touch input.

Also, the external display unit 181 may display an image on the rear window of the vehicle. Since other people push the stopped vehicle 700 to move it, it is possible to display the stopped-vehicle movement information on the rear of the vehicle and dispose the external input unit 113 there.

The external display unit 181 and the external input unit 113 may also be disposed at separate positions. Specifically, referring to FIG. 5, the external display unit 181 may be disposed at a certain region of the rear window of the vehicle and the external input unit 113 may be disposed at a vehicle's trunk side.

When the external display unit 181 and the external input unit 113 are disposed together, the image that includes the stopped-vehicle movement mode execution notification message and the execution input interface as shown in FIG. 6 may be displayed on the external display unit 181. In this instance, a user who is outside the vehicle may see the external display unit 181 and perform an input operation of executing the stopped-vehicle movement mode through the external input unit 113 on the external display 181.

Accordingly, other people and/or the user may control and move the stopped vehicle 700 through the external input unit 113, checking stopped-vehicle movement information through the external display unit 181.

Figure 7:
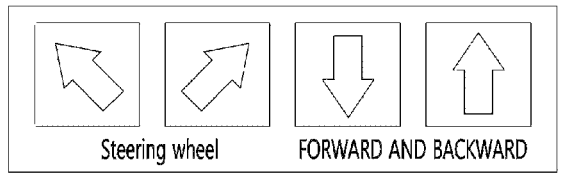
FIG. 7 represents how a stopped-vehicle movement interface image is displayed on an external display unit according to an embodiment.

When the external display unit 181 and the external input unit 113 are disposed at separate positions, a stopped-vehicle movement range may be displayed on the external input unit 113, which may be provided as a movement key controlling vehicle movement as shown in FIG. 7.

In addition, the movement key may include a forward movement key that moves the vehicle forward, a backward movement key that moves the vehicle backward, and a direction key that controls the wheel direction of the vehicle.

The external display unit 181 may include a projection module projecting an image onto a certain region of the front windshield W, as a head up display (HUD).

When the external display unit 181 is implemented as a windshield W display, there is an advantage in that it does not affect the esthetic sense of the exterior of the vehicle because the external display unit is activated and displayed only when the stopped-vehicle movement mode is executed and is not visible when being inactivated.

Also, the external display unit 181 may include at least one of an LCD, a TFT LCD, an OLED, a flexible display, a 3D display, and an e-ink display.

The external output unit 180 may further include the external audio output unit 182 and the external input unit 113 may further include an external microphone.

The external audio output unit 182 may output stopped-vehicle movement information through an audio signal. For example, the external audio output unit 182 may include a speaker that outputs sound.

Such an external audio output unit 182 may assist the execution of the stopped-vehicle movement mode by outputting stopped-vehicle movement information in order to assist the display of the external display unit 181. That is, it is possible to explain the stopped-vehicle movement mode by outputting a message that assists the external display unit 181 in display.

Also, when other people makes a request for a call with the user through the external input unit 113, the processor 170 may provide a call mode in which it is possible to connect to a user terminal through the communication unit 120 and then make a call with the user terminal through the external audio output unit 182 and the external microphone.

That is, the stopped-vehicle movement mode may further provide a call mode in which the user terminal makes a call.

The call mode provided in such a stopped-vehicle movement mode has advantages in that privacy may be protected without leaking information on the user terminal, and other people may easily communicate with the user through the stopped-vehicle 710.

Also, the external output unit 180 may further include the laser output unit 183 that projects light onto the outside of the vehicle to display stopped-vehicle movement information.

Specifically, the laser output unit 183 may display a stopped-vehicle movement range.

Figure 8:
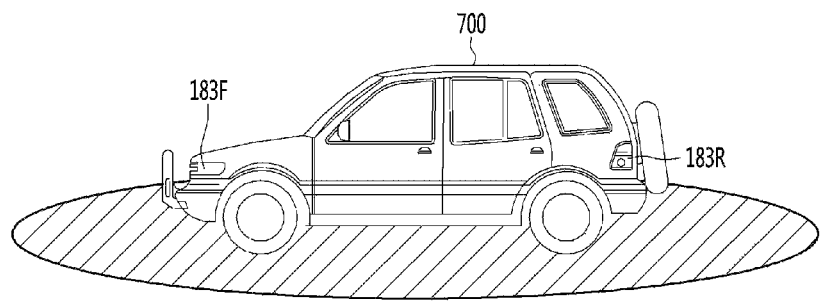
FIG. 8 represents how a laser output unit displays a stopped-vehicle movement range according to an embodiment.

For example, referring to FIG. 8, laser output units 183F and 183R may be disposed at lamps to irradiate the road surface around the vehicle with a laser and thus display the stopped-vehicle movement range.

Specifically, the laser output unit 183F may be disposed at the head lamp to irradiate the road surface with a laser in order to display the front movement limit line. Also, the laser output unit 183R may be disposed at the tail lamp to irradiate the road surface with a laser in order to display the rear movement limit line.

With such a laser output unit 183, other people may intuitively understand the range within which the stopped vehicle may move.

Next, the driver assistance apparatus 100 may include the communication unit 120 that communicates with another vehicle, a terminal 600, a server 500, etc. The driver assistance apparatus 100 may connect to the user terminal through the communication unit 120 to transmit and receive stopped-vehicle movement mode related data.

Specifically, the communication unit 120 may transmit stopped-vehicle movement information to the user terminal.

Also, the communication unit 120 may receive stopped-vehicle movement mode related data that a user inputs with his or her terminal.

Figure 9:
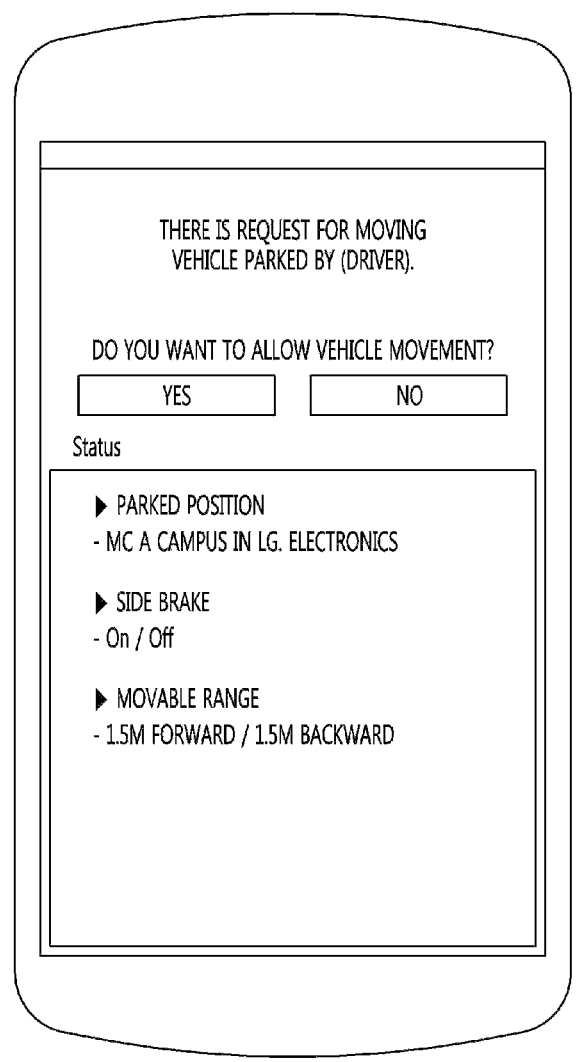
FIG. 9 represents how a stopped-vehicle movement mode execution request and stopped-vehicle movement mode related information are displayed on a user terminal according to an embodiment.

For example, when there is a stopped-vehicle movement mode execution request from other people through the external input unit 113, the communication unit 120 may transmit such a request message to the user terminal as shown in FIG. 9 and transmit stopped-vehicle movement information together. When a user transmits, to the terminal, data enabling or disabling the execution of the stopped-vehicle movement mode, the communication unit 120 may receive and transmit it to the processor 170.

That is, it is possible to enhance security by further including a user terminal approval process when the stopped-vehicle movement mode is executed.

Figure 10:
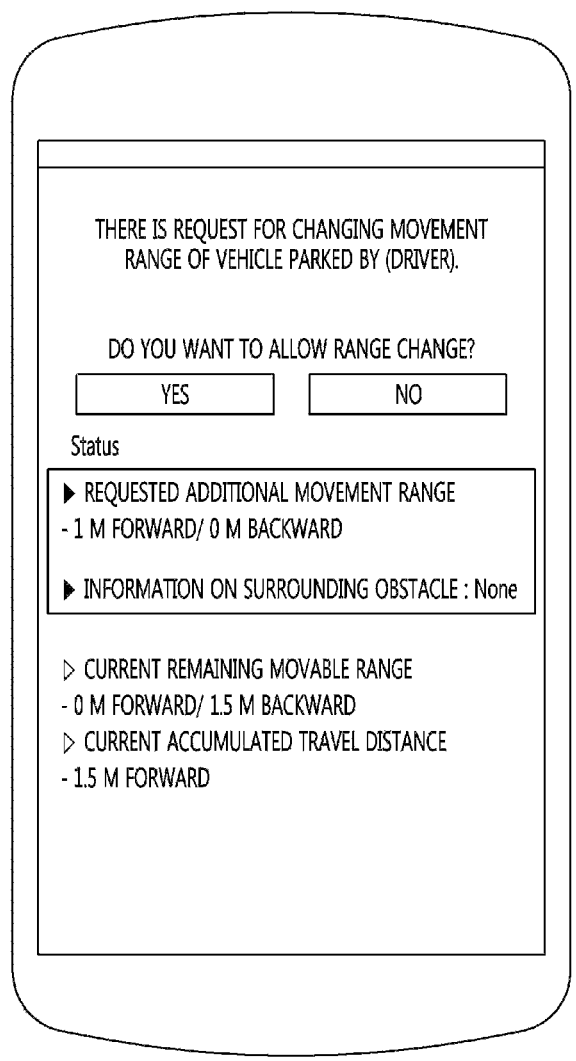
FIG. 10 represents how a stopped-vehicle movement range change request and stopped-vehicle movement mode related information are displayed on a user terminal according to an embodiment.

Also, when other people request a stopped-vehicle movement range change through the external input unit 113, the communication unit 120 may transmit a stopped-vehicle movement range change request message to the user terminal as shown in FIG. 10 and also transmit stopped-vehicle movement information together.

When the user transmits, to the terminal, data enabling or disabling the stopped-vehicle movement range change, the communication unit 120 may receive and transmit it to the processor 170.

Also, the communication unit 120 may continuously transmit stopped-vehicle movement information to the user terminal when the stopped-vehicle movement mode is executed.

Figure 11:
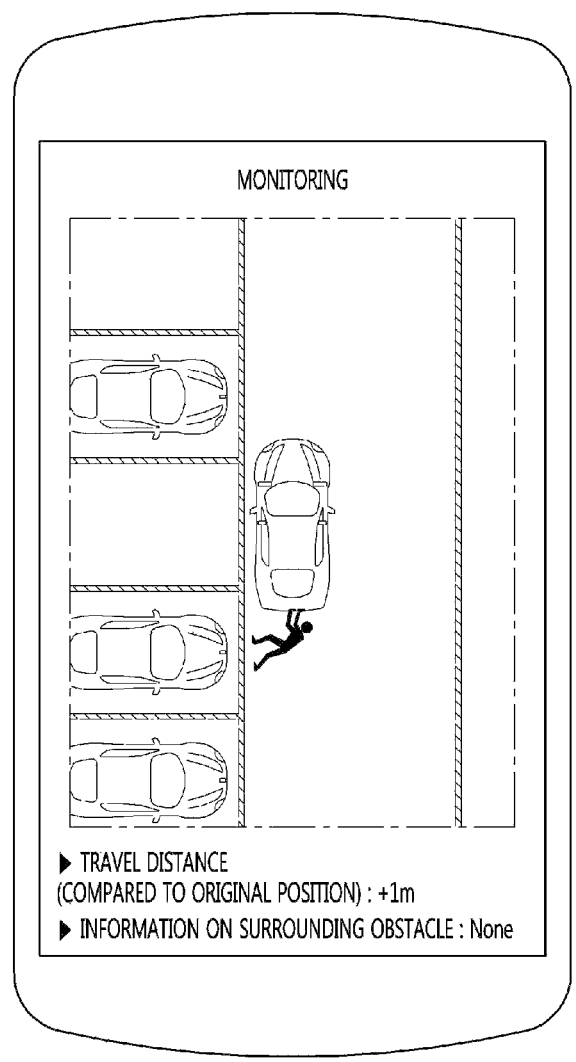
FIG. 11 represents how stopped-vehicle movement information is displayed on a user terminal according to an embodiment.

For example, the communication unit 120 may transmit, to the user terminal, an around view monitor image that is an image around the vehicle including the stopped vehicle 700 as shown in FIG. 11, and the user may check in real time whether the vehicle safely moves, through the terminal. In this instance, when it is determined that vehicle movement is dangerous, the user may also cancel the execution of the stopped-vehicle movement mode through the terminal.

The communication unit 120 may exchange data with the terminal 600 or the server 500 wirelessly. In particular, the communication unit 120 may wirelessly exchange data with the mobile terminal of a vehicle driver. The wireless data communication scheme may include various data communication schemes, such as BLUETOOTH™, WiFi, Direct WiFi, APiX, or NFC schemes.

The communication unit 120 may receive position information, weather information, or road traffic information, e.g., transport protocol expert group (TPEG) information, from the mobile terminal 600 or the server 500.

Also, when a user gets in the vehicle, the mobile terminal 600 of the user and the driver assistance apparatus 100 may also perform pairing automatically or by the execution of an application by the user.

The display apparatus 100 may include a camera 160 that captures images around a vehicle. The camera 160 may capture images around the vehicle to obtain surrounding images and the obtained surrounding images may be displayed through the internal and external display units 181 and 186.

Also, the camera 160 may obtain images around the vehicle and the processor 170 may analyze the images to detect obstacles around the vehicle. That is, camera 160 may also be used as a sensor unit 150 that detects the obstacles around the vehicle.

Such a camera 160 may further include a plurality of cameras 160.

Figure 12:
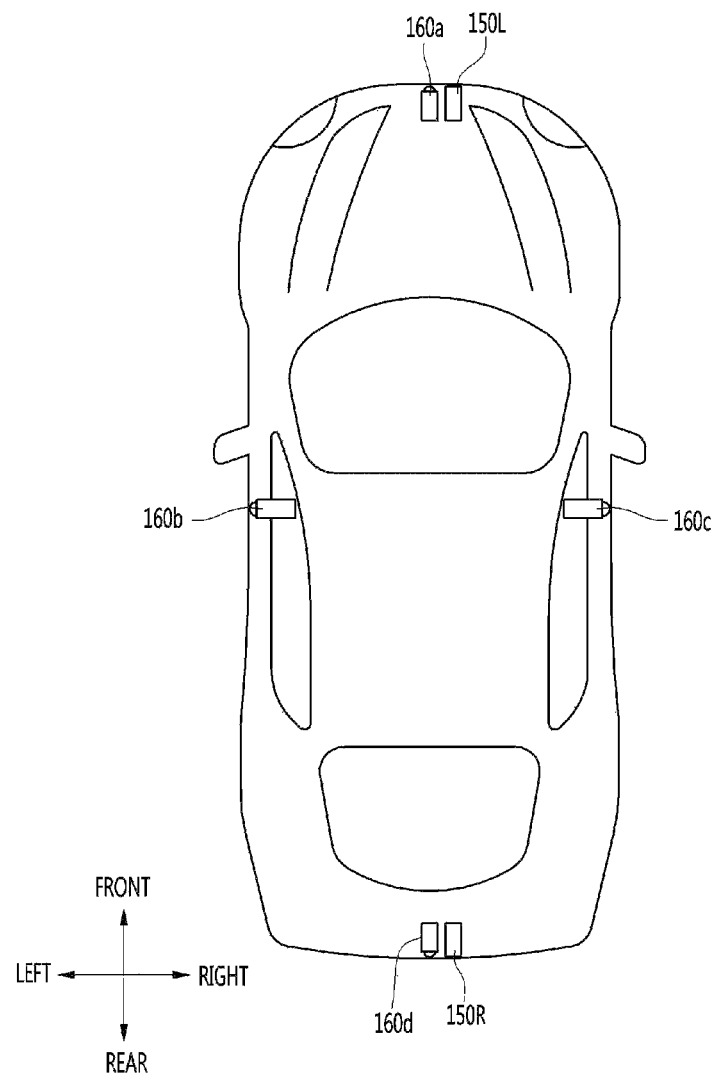
FIG. 12 is a plan view of a vehicle that includes a driver assistance apparatus according to an embodiment.

Referring to FIG. 12, a plurality of cameras 160a to 160d may be disposed on at least one of the front, left, right and rear of the vehicle, respectively.

The left camera 160b may be disposed in a casing that surrounds a left side mirror. Alternatively, the left camera 160b may be disposed outside the casing that surrounds the left side mirror. Alternatively, the left camera 160b may be disposed on a region outside a left front door, a left rear door or left fender.

The right camera 160c may be disposed in a casing that surrounds a right side mirror. Alternatively, the right camera 160c may be disposed outside the casing that surrounds the right side mirror. Alternatively, the right camera 160c may be disposed on a region outside a right front door, a right rear door or right fender.

Also, the rear camera 160d may be disposed near a rear number plate or trunk switch.

Also, the front camera 160a may be disposed near an emblem or radiator grill.

The processor 170 may synthesize the images captured in all directions to provide an around view image from the top view of the vehicle. When the around view image is generated, boundaries are generated between image regions. These boundaries may be naturally displayed by image blending.

Figure 13:
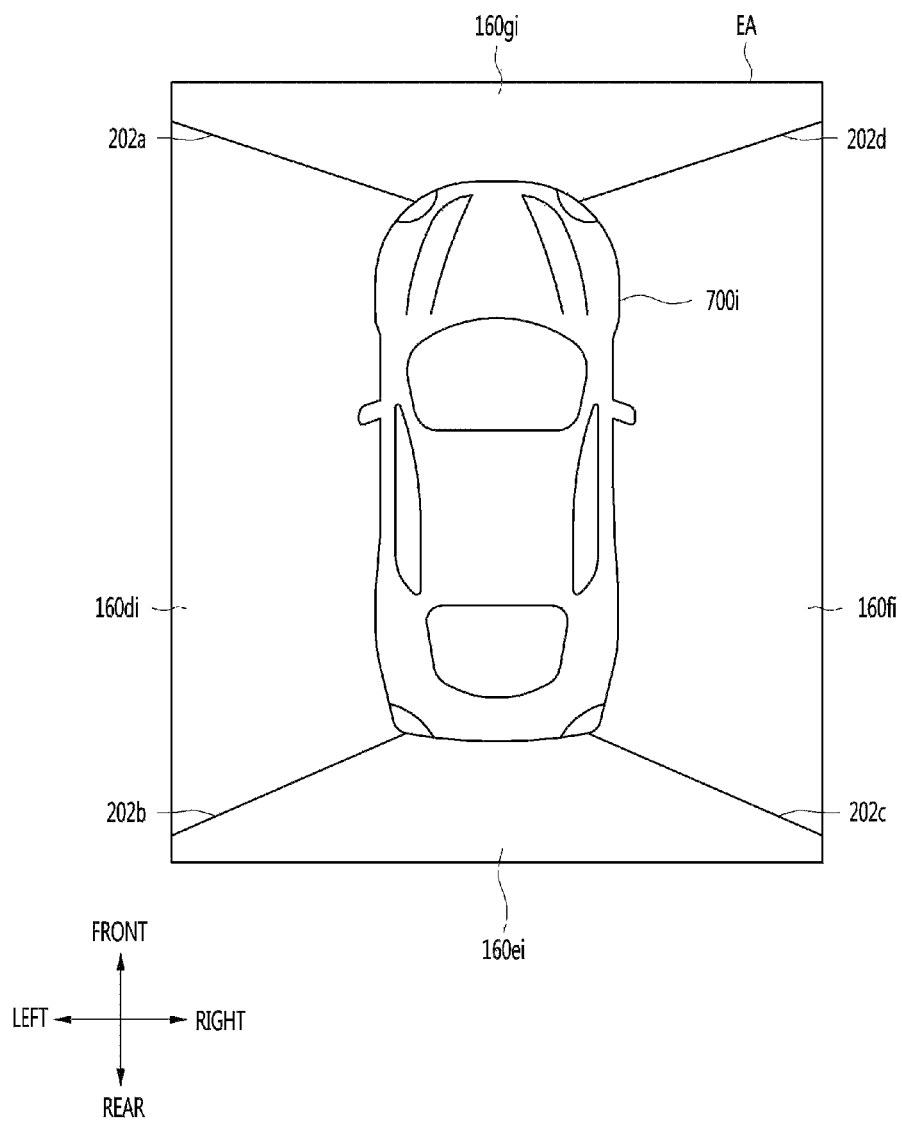
FIG. 13 is a diagram representing an around view image by using an image captured by a camera according to an embodiment.

Specifically, referring to FIG. 13, the around view monitor image EA may include a first image region 160di captured by the left camera 160b, a second image region 160ei captured by the rear camera 160d, a third image region 160fi captured by the right camera 160c, and a fourth image region 160gi captured by the front camera 160a.

When generating the around view image including such a plurality of image regions, boundaries are generated between image regions. These boundaries may be naturally displayed by image blending. In this instance, boundary lines 202a to 202d may also be displayed at the boundaries between the plurality of images.

A vehicle image 700i may be included in the around view monitor image. In this example, the vehicle image 700i may be a virtual image generated by the processor 170 but is not limited thereto.

The around view image may be displayed on the external display unit 181 to assist the safe movement of the stopped vehicle 700 outside.

Also, the around view image may be displayed on the user terminal through the communication unit 120 so that the user may check the movement state of his or her vehicle.

Such a camera 160 may include an image sensor and an image processing module. The camera 160 may process a still image or video that is obtained by the image sensor (e.g., CMOS or CCD). The image processing module may process the still image or video obtained by the image sensor to extract necessary information, and deliver the extracted information to the processor 170.

The camera 160 may be a stereo camera. The processor 170 may obtain a stereo image around the vehicle from a stereo camera, perform a disparity operation on the front of the vehicle based on the stereo image, perform object detection on at least one of stereo images based on the disparity information and continue to track the motion of an object after the object detection. That is, the processor 170 may use such a stereo camera to accurately detect an obstacle around the vehicle and the distance between the obstacle and the vehicle.

In addition, when an obstacle is detected from the image captured by the camera 160, in the driving direction of the vehicle in the stopped-vehicle movement mode, the processor 170 may operate a brake through a brake driving control unit (brake driving controller) 171 to prevent collision with the obstacle. That is, the processor 170 may use the camera 160 to perform an AEB function.

Next, the driver assistance apparatus 100 may include a sensor unit 150 that detects an obstacle around a vehicle.

Specifically, referring to FIG. 12, a front sensor unit 150L may be disposed near the emblem or radiator grill in order to detect an obstacle in front of the vehicle. Also, a rear sensor unit 150R may be disposed near the rear number plate or trunk switch in order to detect an obstacle behind the vehicle.

Such a sensor unit 150 may include various distance measurement sensors, such as a laser sensor, an ultrasonic sensor, a stereo camera, etc.

For example, the sensor unit 150 may use the laser sensor to detect an obstacle. Specifically, the laser sensor may irradiate the outside with a laser and receive a reflection signal that is reflected from the obstacle. In addition, it is possible to analyze laser signal information and the reflection signal information to measure the distance between the side of the vehicle and the obstacle.

For example, it is possible to measure the distance between the vehicle and the object by using time-of-flight (TOF) and/or phase shift according to a laser signal modulation method. Specifically, it is possible to measure the distance to the object by emitting a pulse laser signal according to a time delay method and measuring a time when reflected pulse signals from the objects within a measurement range reach a receiver.

In this way, the sensor unit 150 may accurately measure the distance between the position of the obstacle and the vehicle when there is the obstacle around the vehicle.

In addition, the processor 170 may provide an AEB function by using obstacle information measured by the sensor unit 150. For example, when there is an obstacle within a certain distance in the movement direction of the vehicle, the processor 170 may operate a brake so that the stopped vehicle 700 brakes.

Figure 14:
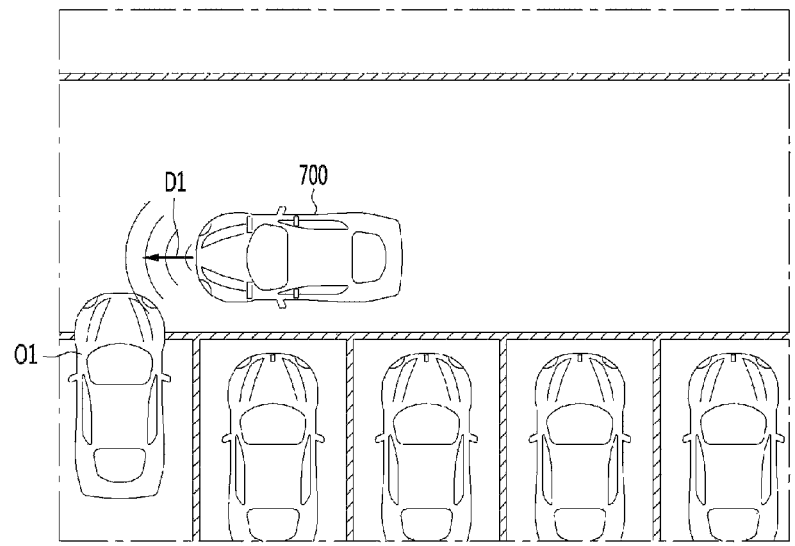
FIG. 14 is a diagram for explaining a forward autonomous emergency braking (AEB) function according to an embodiment.

Referring to FIG. 14, the stopped vehicle 700 may move to the front D1 by other people or the user in a stopped-vehicle movement mode.

For example, other people may move the stopped vehicle 700 forward by pushing the stopped vehicle 700 from the trunk side outside the stopped vehicle 700 or move the stopped vehicle 700 forward through the external input unit 113. In this instance, other people may continue to move the stopped vehicle 700 forward without seeing a first object 01 present in front D1 of the stopped vehicle 700.

The sensor unit 150 may measure the distance to the first object 01 present in the movement direction D1 of the stopped vehicle 700, and when the distance between the first object 01 and the stopped vehicle 700 is within a certain distance, the processor 170 may operate a brake so that the stopped vehicle 700 brakes.

That is, the processor 170 may provide an AEB function in a stopped-vehicle movement mode to safely move the stopped vehicle 700.

Figure 15:
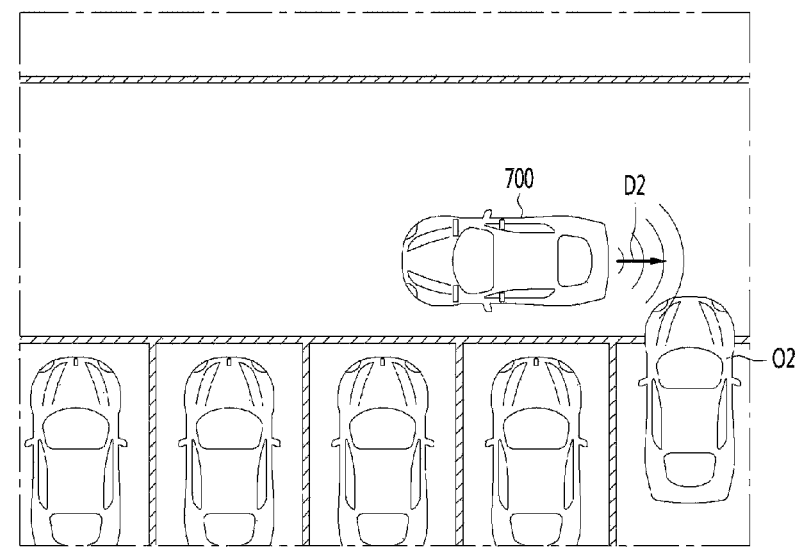
FIG. 15 is a diagram for explaining a backward AEB function according to an embodiment.

Referring to FIG. 15, the stopped vehicle 700 may move to the rear D2 by other people or the user in a stopped-vehicle movement mode.

For example, other people may move the stopped vehicle 700 backward by pushing the stopped vehicle 700 near the emblem outside the stopped vehicle 700 or move the stopped vehicle 700 backward through the external input unit 113. In this instance, other people may continue to move the stopped vehicle 700 backward without seeing a second object 02 present behind D2 the stopped vehicle 700.

The sensor unit 150 may measure the distance to the second object 02 present in the movement direction D2 of the stopped vehicle 700, and when the distance between the second object 02 and the stopped vehicle 700 is within a certain distance, the processor 170 may operate a brake so that the stopped vehicle 700 brakes.

That is, the processor 170 may provide a rear AEB function in a stopped-vehicle movement mode to safely move the stopped vehicle 700.

In addition to operating in the stopped-vehicle movement mode, the rear AEB function may operate even in a situation in which the vehicle suddenly moves backward.

For example, when the vehicle drives on a slope, the vehicle may suddenly move in an unintended direction by the slope.

Figure 16:
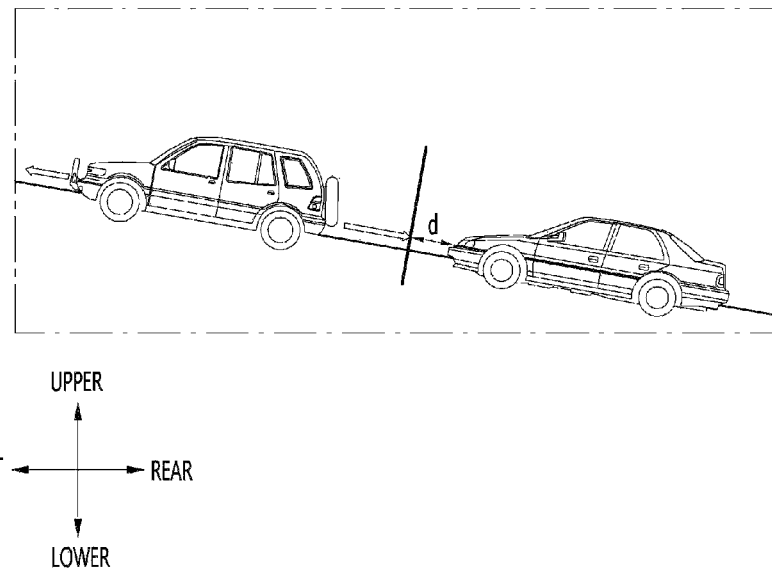
FIG. 16 is a diagram for explaining a backward AEB function according to another embodiment.

Referring to FIG. 16, the vehicle may suddenly move backward while driving on the slope. For example, when the vehicle is in a neutral gear, it may move backward. In this instance, the sensor unit 150 may measure the distance to another vehicle present behind the vehicle, and the processor 170 may perform the rear AEB function to prevent collision with the rear vehicle when the measured distance is within a certain distance d.

Next, the driver assistance apparatus 100 may include the memory 140.

Specifically, the memory 140 may store various pieces of data for the overall operations of the driver assistance apparatus 100, such as programs for processing or controlling by the processor 170.

For example, the memory 140 may store stopped-vehicle movement mode related data. Specifically, the memory 140 may store a stopped-vehicle movement range.

For the stopped vehicle 700, the driver assistance apparatus 100 of which is operating, the stopped-vehicle movement range may be set in order to provide the stopped-vehicle movement mode. In this example, the stopped-vehicle movement range means a range within which other people and/or the user may move the stopped vehicle 700 in the stopped-vehicle movement mode.

Figure 17:
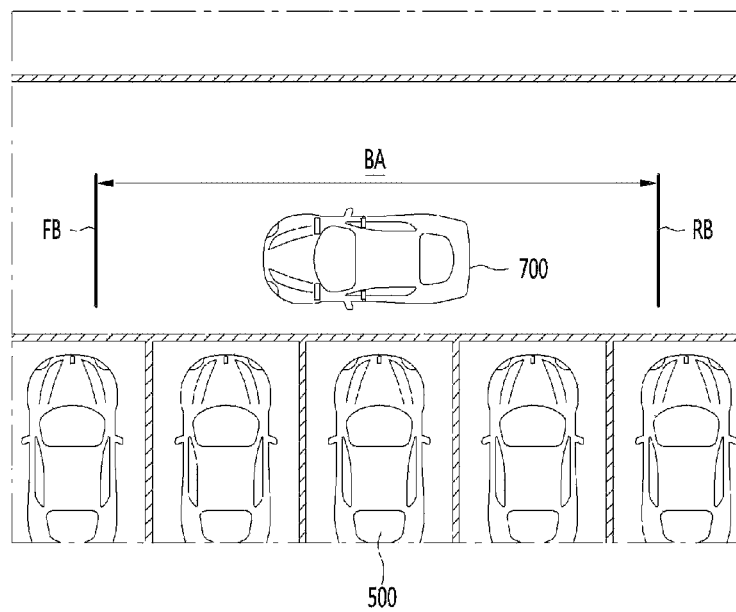
FIG. 17 is a diagram for explaining a stopped-vehicle movement range according to an embodiment.
Figure 18:
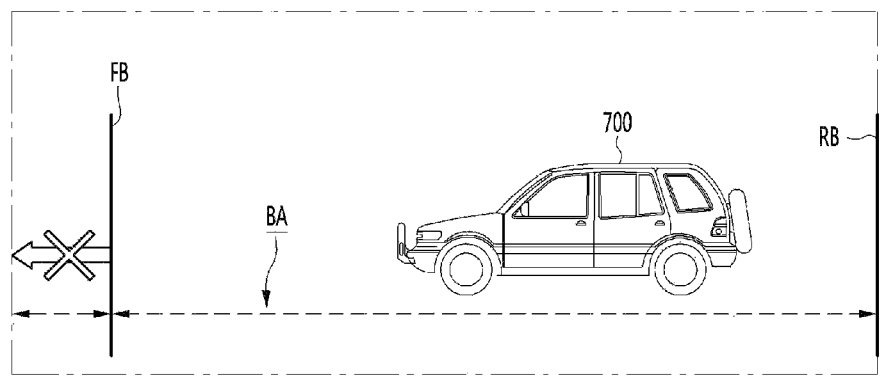
FIG. 18 is a side view of a vehicle for explaining a stopped-vehicle movement range according to an embodiment.

Referring to FIGS. 17 and 18, the stopped-vehicle movement range BA may be a region between a front movement limit line FB to which the vehicle may move forward, and a rear movement limit line RB to which the vehicle may move backward.

The memory 140 may store the stopped-vehicle movement range that has been set directly by the user before the vehicle stops, and then provide it to the processor 170 when the stopped-vehicle movement mode is executed, thereby moving the stopped vehicle 700 within the stopped-vehicle movement range.

In another embodiment, when the user has not set the stopped-vehicle movement range before stopping the vehicle, the memory 140 may store a default stopped-vehicle movement range. For example, the memory 140 may store, a distance of about two times to four times the full width of a general vehicle, as the stopped-vehicle movement range.

In still another embodiment, the memory 140 may store a stopped-vehicle movement range automatically set by the processor 170. For example, the processor 170 may check the situation around the vehicle, set a movement position suitable for picking another vehicle out, then set it as the stopped-vehicle movement range and store the setting in the memory 140.

In still another embodiment, the user may also set the stopped-vehicle movement range remotely through a terminal.

Such a stopped-vehicle movement range may be corrected according to a request from other people and/or user's resetting.

Such a stopped-vehicle movement range may prevent vehicle theft or loss through the setting of the movement limit of the stopped vehicle 700 and allow the movement of the stopped vehicle 700 only within a safe region.

The memory 140 may store data for an object check. For example, the memory 140 may store data for checking through a certain algorithm what an object is when a certain object is detected from an image acquired through the camera 160.

For example, the memory 140 may store data on traffic information as data for the object check. For example, the memory 140 may be provided to compare traffic information with the data on the traffic information through the certain algorithm when certain traffic information, such as a lane or traffic sign is detected from the image acquired through the camera 160.

The memory 140 may be various storage devices, such as ROMs, RAMs, EPROMs, flash drives, hard drives, etc. that are hardware.

Next, the driver assistance apparatus 100 may include an interface unit 130 that receives vehicle related data or transmits a signal processed or generated by the processor 170 to the outside.

Specifically, the processor 170 may include the brake driving control unit 171, which may transmit a brake operation signal and a brake release signal to the control unit 770 and/or sensing unit 760 of the vehicle through the interface unit 130 to turn on/off the brake.

Also, when the vehicle performs self-driving in a stopped-vehicle movement mode, the processor 170 may transmit a driving manipulation means control signal to the control unit and/or sensing unit of the vehicle through the interface unit 130 to allow the stopped vehicle 700 to perform self-driving or automatically park the stopped vehicle 700.

Also, the processor 170 may receive navigation information and/or sensor information through the interface unit 130.

To this end, the interface unit 130 may perform data communication with the control unit 770, an audio video navigation (AVN) device 400 and/or the sensor unit 760 in the vehicle through wired or wireless communication.

The interface unit 130 may receive navigation information through data communication with the control unit 770, the AVN device 400 and/or a separate navigation device.

Also, the interface unit 130 may receive sensor information from the control unit 770 or the sensor unit 760. In this example, the sensor information may include at least one of vehicle direction information, position information, speed information, acceleration information, tilt information, forward/backward movement information, fuel information, information on the distance to the front and rear vehicles, information on the distance between a vehicle and a lane, and turn signal information.

Also, the sensor information may be acquired from a heading sensor, a yaw sensor, a gyro sensor, a position module, a vehicle's forward/backward movement sensor, a wheel sensor, a vehicle speed sensor, a vehicle-body tilt sensor, a battery sensor, a fuel sensor, a tire sensor, a steering sensor by the rotation of a steering wheel, a vehicle's internal temperature sensor, and a vehicle's internal humidity sensor, etc. The position module may include a GPS module for GPS information reception.

The processor 170 may accurately measure the position of the stopped vehicle 700 through the sensor information or navigation information obtained through the interface unit 130 and/or information obtained from the communication unit 120.

The interface unit 130 may receive a user input received through the user input unit 110 of the vehicle. The interface unit 130 may receive the user input from the user input unit 110 of the vehicle or through the control unit 770. That is, in case the input unit 110 is disposed as a component of the vehicle therein, it is possible to receive the user input through the interface unit 130.

The interface unit 130 may also receive traffic information acquired from the server 500. The server 500 may be a server that is located at a traffic control center controlling traffic. For example, in case the traffic information is received from the server 500 through the communication unit 120 of the vehicle, the interface unit 130 may also receive the traffic information from the control unit 770.

The driver assistance apparatus 100 may include the processor 170 that controls the overall operations of each unit in the driver assistance apparatus 100.

The processor 170 provides a stopped-vehicle movement mode so that other people/the user may safely move the stopped vehicle 700 within a stopped-vehicle movement range even when the vehicle stops.

Specifically, the processor 170 may turn on/off the brake through the brake driving control unit 171 depending on the situation to move the stopped vehicle safely and easily.

The brake driving control unit 171 may transmit a brake operation signal and a brake release signal to the control unit 770 and/or sensing unit 760 of the vehicle through the interface unit 130 to turn on/off the brake. Also, the brake driving control unit 171 may also transmit a brake control signal directly to a brake driving unit to turn on/off the brake.

The processor 170 may provide a stopped-vehicle movement mode in which it is possible to move the stopped vehicle 700 in a state in which the vehicle stops and then the ignition is off.

For example, the processor 170 may use the auxiliary power source (e.g., electricity) of the vehicle to execute the stopped-vehicle movement mode. That is, the stopped-vehicle movement mode may be a function of moving the stopped vehicle 700 that is provided in a state in which the ignition is off.

However, it is also possible for the processor 170 to turn on the ignition directly and then provide the stopped-vehicle movement mode by using power from the engine.

The processor 170 may set a stopped-vehicle movement range before the execution of the stopped-vehicle movement mode.

For example, when a user directly inputs the stopped-vehicle movement before stopping the vehicle, the processor 170 may store it in the memory 140 and then move the stopped vehicle 700 within the stopped-vehicle movement range.

Also, if the user has not set the stopped-vehicle movement range before stopping the vehicle, the processor 170 may set a distance of about two times to four times the full width of a general vehicle as the stopped-vehicle movement range and store it in the memory 140.

Also, the processor 170 may check the situation around the vehicle from images around the vehicle and sensor information, detect a safe vehicle movement range, set the detected range as the stopped-vehicle movement range and store the set range in the memory 140.

The processor 170 may also reset the stopped-vehicle movement range set in this way. For example, when there is a request from other people, it is also possible to reset the stopped-vehicle movement range when a request for the change of the stopped-vehicle movement range is transmitted to a user terminal and approval is received.

In addition, the processor 170 may execute the stopped-vehicle movement mode when there is a request for the execution of the stopped-vehicle movement mode.

For example, the processor 170 may execute the stopped-vehicle movement mode when a request for the movement of the stopped vehicle 700 is input through the external input unit 113.

Also, when it is sensed near the trunk or emblem that other people have applied a physical force equal to or greater than a certain value, the processor 170 may detect it as a movement request signal for the stopped vehicle 700 and execute the stopped-vehicle movement mode.

Also, when there is a request for the movement of the stopped vehicle 700, the processor 170 may transmit a request signal to a user terminal and may or may not execute the stopped-vehicle movement mode according to the response from the user terminal. In this instance, stopped-vehicle movement information is together transmitted, so it may assist a user in recognizing the situation. Inn addition, when the user receives data enabling the execution of the stopped-vehicle movement mode with his or her terminal, the processor 170 may execute the stopped-vehicle movement mode and enhance the security of the stopped-vehicle movement mode.

Also, when a stopped-vehicle movement mode execution signal is received from the user terminal, the processor 170 may authenticate the user terminal and execute the stopped-vehicle movement mode after the authentication of the terminal.

When the stopped-vehicle movement mode is executed, the processor 170 may output stopped-vehicle movement information through the external output unit 180.

The stopped-vehicle movement information may include at least one of a notification of the execution of the stopped-vehicle movement mode, the stopped-vehicle movement range within which the vehicle may move, a notification of who is responsible for vehicle movement, a map including the stopped vehicle, a vehicle's external control movement key, a stopped vehicle 700 around view monitor image and user call information.

Specifically, the processor 170 may display the stopped-vehicle movement information on the external display unit 181. Also, since the stopped-vehicle movement information is also output as an audio signal through the external audio output unit 182, it is possible to supplement the information displayed on the external display unit 181.

For example, the processor 170 may display a notification of the execution of the stopped-vehicle movement mode and provide an image as shown in FIG. 17 or 18 to display the stopped-vehicle movement range.

When the stopped-vehicle movement mode is executed, the processor 170 may continuously transmit stopped-vehicle movement information according to the execution of the stopped-vehicle movement mode.

For example, the processor 170 may transmit, to the user terminal, an around view monitor image that is an image around the vehicle including the stopped vehicle 700 so that the user may check in real time whether the vehicle safely moves, through the terminal. In this instance, the processor 170 may cancel the execution of the stopped-vehicle movement mode through the terminal and operate the brake, when the user determines that vehicle movement is dangerous.

The processor 170 may assist the movement control of the stopped vehicle 700 during the execution of the stopped-vehicle movement mode.

Specifically, when the stopped-vehicle movement mode is executed, the processor 170 may release the brake through the brake driving control unit 171 and maintain the stopped vehicle 700 in a neutral gear.

Other people may check through the external output unit 180 that the brake has been released and push the stopped vehicle 700 to move it in a desired direction.

In another embodiment, the processor 170 may provide a stopped vehicle 700 movement interface for moving the stopped vehicle 700. Specifically, the processor 170 may provide a controllable movement key that moves the stopped vehicle 700 with its own power source in order to provide the stopped vehicle 700 movement interface. In this instance, the movement key may include a forward movement key that moves the vehicle forward, a backward movement key that moves the vehicle backward, and a direction key that controls the wheel direction of the vehicle.

Other people may also move the stopped vehicle 700 easily through the movement key of the external input unit 113.

In another embodiment, the processor 170 may provide a remote control interface for moving the stopped vehicle 700.

Specifically, the processor 170 may display the stopped-vehicle movement information on the user terminal through the communication unit 120, and receive a remote control signal input from the user terminal to move the stopped vehicle 700.

For example, when the processor 170 transmits a real-time around view image to the terminal and the user drags a virtual image of a stopped vehicle 700 to a desired position through the terminal, the processor 170 may receive the drag signal to move the stopped vehicle 700 to the drag position.

The processor 170 may continuously measure the position of the stopped vehicle 700 during the execution of the stopped-vehicle movement mode. For example, the processor 170 may accurately measure the position of the stopped vehicle 700 through the sensor information or navigation information obtained through the interface unit 130 and/or information obtained from the communication unit 120.

In addition, the processor 170 may provide an AEB function during the movement of the stopped vehicle 700.

Such an AEB function may also be provided during the movement of the stopped vehicle 700 in a state in which the ignition is off.

Also, such an AEB function may also be provided during movement in a state in which the stopped vehicle 700 is in a neutral gear.

Also, the AEB function may also operate when the stopped vehicle 700 moves backward or when there is an obstacle behind the stopped vehicle.

Specifically, in the stopped-vehicle movement mode, the stopped vehicle 700 may move forward by other people or the user. For example, other people may push the stopped vehicle 700 near its trunk outside the stopped vehicle 700 to move forward. In this instance, other people may continue to move the stopped vehicle 700 forward without seeing an obstacle present in front of the vehicle. The processor 170 may measure the distance to the obstacle present in the movement direction (front) of the stopped vehicle 700 through the sensor unit 150, and when the distance between the obstacle and the stopped vehicle 700 is within a certain distance, the processor 170 may operate the brake so that the stopped vehicle 700 brakes. That is, the processor 170 may provide an AEB function in a stopped-vehicle movement mode to safely move the stopped vehicle 700.

In the stopped-vehicle movement mode, the stopped vehicle 700 may move backward by other people or the user. For example, other people may move the stopped vehicle 700 rearward by pushing the stopped vehicle 700 near the emblem outside the stopped vehicle 700 or move the stopped vehicle 700 backward through the external input unit 113. In this instance, other people may continue to move the stopped vehicle 700 backward without seeing the obstacle present behind the vehicle.

The processor 170 may measure the distance to the obstacle present in the movement direction (rear) of the stopped vehicle 700 through the sensor unit 150, and when the distance between the obstacle and the stopped vehicle 700 is within a certain distance, the processor 170 may operate the brake so that the stopped vehicle 700 brakes. That is, the processor 170 may provide a rear AEB function in a stopped-vehicle movement mode to safely move the stopped vehicle 700.

In addition to operating in the stopped-vehicle movement mode, the rear AEB function may operate even in a situation in which the vehicle suddenly moves backward. For example, when the vehicle drives on the slope, the vehicle may suddenly move in an unintended direction by the slope.

For example, when the vehicle is in a neutral gear, it may suddenly move backward when driving on the slope. In this instance, the processor 170 may measure the distance to another vehicle present behind the vehicle, and the processor 170 may perform the rear AEB function to prevent collision with the rear vehicle when the measured distance is within a certain distance.

In this instance, the processor 170 may designate a dead zone where the AEB is not executed even when an obstacle is detected.

For example, when in order to move the stopped vehicle 700, other people apply an external physical force to push the stopped vehicle 700 or are adjacent to the stopped vehicle 700 for the control of a stopped vehicle 700 movement interface, other people may be recognized as an obstacle, so the AEB function may be executed. In order to accommodate this, the place where other people controlling the movement of the stopped vehicle 700 are located may be designated as the dead zone and sensing an obstacle from the dead zone may not be attempted.

Figure 19:
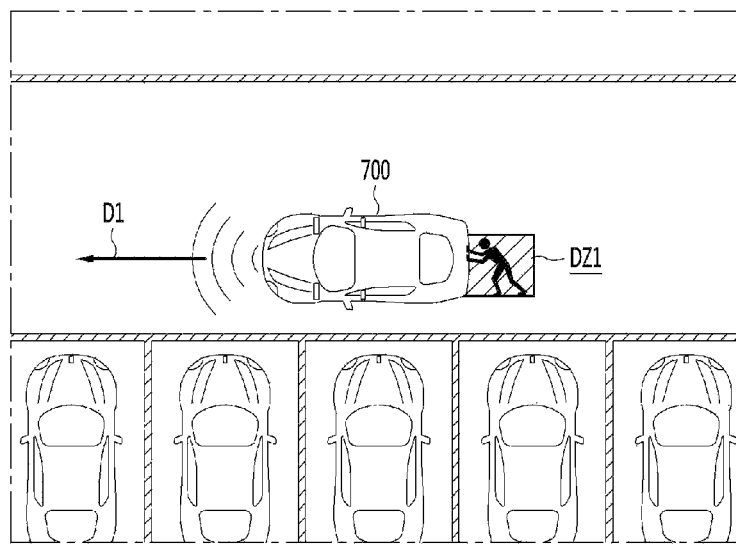
FIGS. 19 and 20 are diagrams for explaining a dead zone according to an embodiment.

Specifically, referring to FIG. 19, when pushing the stopped vehicle 700 from the trunk side or using the external input unit 113 on the trunk side, the processor 170 may designated a region adjacent to the vehicle's trunk as a dead zone DZ1.

Figure 20:
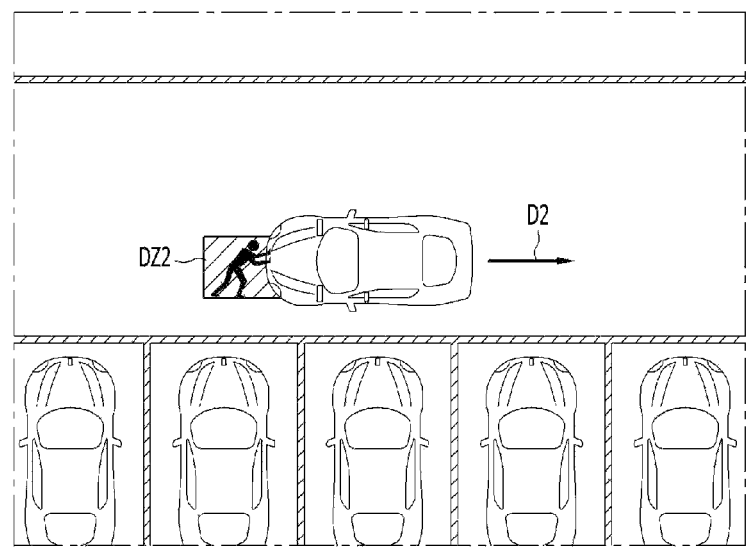

Also, referring to FIG. 20, when pushing the stopped vehicle 700 near the emblem or using the external input unit 113 near the emblem, the processor 170 may designated a region adjacent to the vehicle emblem as a dead zone DZ2.

Figure 31:
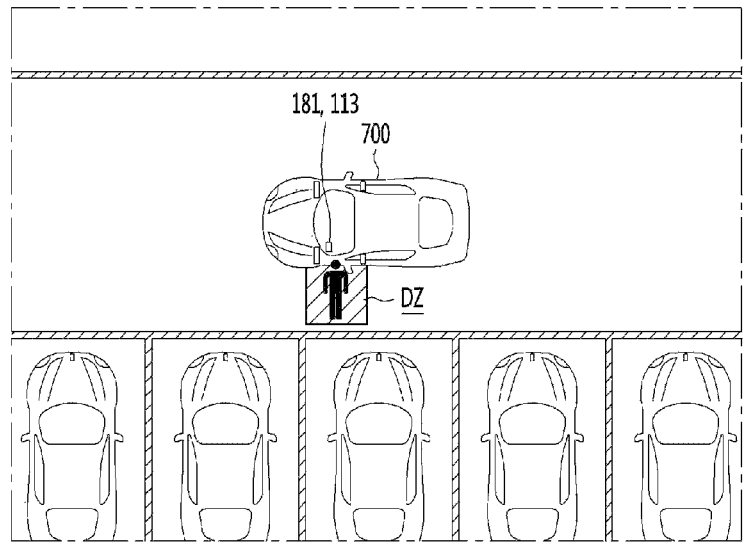

Also, referring to FIG. 31, when the stopped vehicle 700 is controlled through the external touch screen 181, 113 on the side of the stopped vehicle 700, the processor 170 may determine it and designate a region adjacent to the external input unit 113 of the vehicle as a dead zone DZ.

That is, the processor 170 may determine a region where other people controlling the movement of the stopped vehicle 700 are located, set the region as a dead zone and smoothly move the stopped vehicle 700.

The processor 170 may enable the stopped vehicle 700 to be located within a stopped-vehicle movement range. Specifically, the processor 170 may operate the brake through the brake driving control unit 171 when the stopped vehicle 700 gets out of the stopped-vehicle movement range.

Referring to FIG. 17, when the stopped vehicle 700 moves forward and thus to the front movement limit line FB, the processor 170 may turn on the brake so that the stopped vehicle 700 no longer moves.

Likewise, when the stopped vehicle 700 moves backward and thus to the rear movement limit line RB, the processor 170 may turn on the brake so that the stopped vehicle 700 no longer moves.

If other people want to move the stopped vehicle 700 to the outside of the stopped-vehicle movement range, it is possible to request for the change of the stopped-vehicle movement range through the external input unit 113 and the stopped-vehicle movement range may be reset according to user terminal's approval.

The processor 170 may end a stopped vehicle 700 movement mode when the stopped vehicle 700 movement mode is executed and the position of the stopped vehicle 700 does not change for a preset time.

Specifically, when other people move the stopped vehicle 700 to a desired position, it is possible to end the stopped vehicle 700 movement mode.

After the stopped-vehicle movement mode ends, the processor 170 may return the stopped vehicle 700 to the position of the stopped vehicle 700 before the execution of the stopped-vehicle movement mode.

Figure 21:
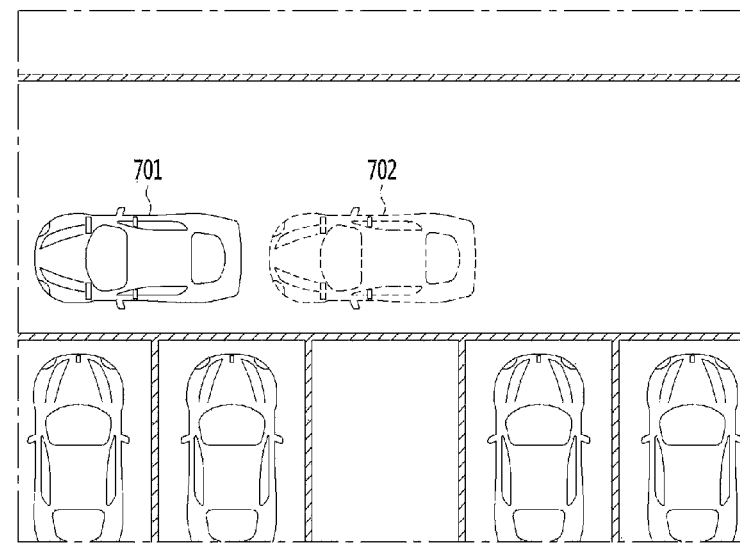
FIG. 21 is a diagram for explaining stopped-vehicle control after the end of a stopped-vehicle movement mode according to an embodiment.

Referring to FIG. 21, the stopped vehicle 700 before the execution of the stopped-vehicle movement mode may move forward by the stopped-vehicle movement mode. When the stopped-vehicle movement mode ends, the processor 170 may perform self-driving from the position 701 after the execution of the stopped-vehicle movement mode to the position 702 before the execution of the stopped-vehicle movement mode. Thus, the user may see that the vehicle is located at the position where it had been originally located, irrespective of whether the stopped-vehicle movement mode has been executed.

In another embodiment, after the stopped-vehicle movement mode ends, the processor 170 may scan a safe parking space and automatically park in the scanned parking space.

Figure 22:
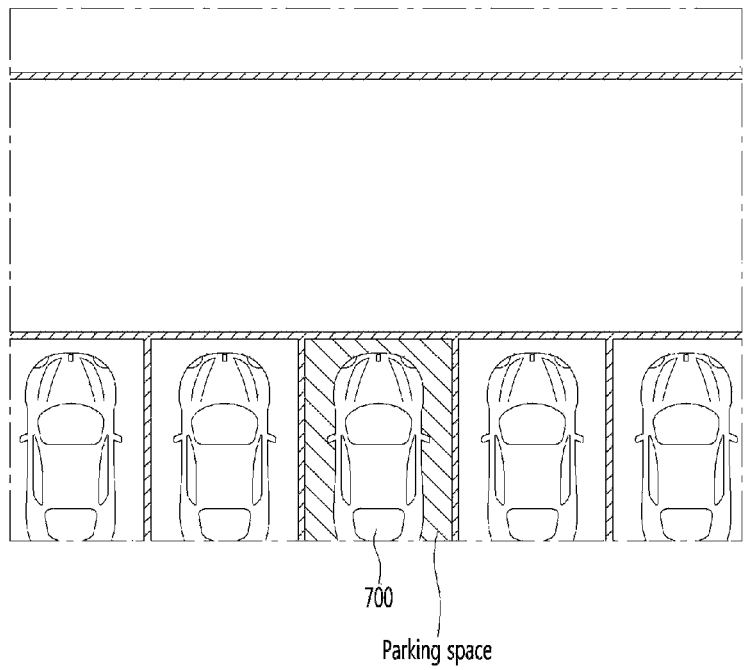
FIG. 22 is a diagram for explaining stopped-vehicle control after the end of a stopped-vehicle movement mode according to another embodiment.

Referring to FIG. 22, other people may pick their vehicles out after moving the stopped vehicle 700. Thus, since the position where a vehicle of other people was previously located may be available for parking, the processor 170 may scan it as a parking space through the sensor unit 150 or camera 160.

The processor 170 may automatically park a vehicle in the parking space scanned in this way so that the vehicle may stop in a safe space. Furthermore, the processor 170 determines that the stopped-vehicle movement mode is no longer required and may turn off the driver assistance apparatus 100.

As such, the processor 170 may provide the stopped-vehicle movement mode in which it is possible to easily and safely move a vehicle as needed even after the vehicle stops, thereby increasing the convenience of a user and other people.

The processor 170 may be implemented by using at least one of an application specific integrated circuit (ASIC), a digital signal processor (DSP), a digital signal processing device (DSPD), a programmable logic device (PLD), a field programmable gate array (FPGA), the processor 170, a controller, a micro-controller, a microprocessor, and electrical units for executing other functions. In addition, such a processor 170 may be controlled by a control unit or control various functions of the vehicle through the control unit.

In the following, a method of providing the stopped-vehicle movement mode is described in more detail with reference to FIGS. 23 to 26.

Firstly, as a stopped-vehicle movement mode preparation step, a stopped-vehicle movement range may be set before or during the execution of the stopped-vehicle movement mode.

For example, when a user directly inputs the stopped-vehicle movement before stopping the vehicle, the processor 170 may store it in the memory 140 and then move the stopped vehicle 700 within the stopped-vehicle movement range.

Also, when the user has not set the stopped-vehicle movement range before stopping the vehicle, the processor 170 may set a default stopped-vehicle movement range.

Also, the processor 170 may check the situation around the vehicle from images around the vehicle and sensor information, detect a safe vehicle movement range, set the detected range as the stopped-vehicle movement range and store the set range in the memory 140.

The processor 170 may also reset the stopped-vehicle movement range set. For example, when there is a request from other people, it is also possible to reset the stopped-vehicle movement range when a request for the change of the stopped-vehicle movement range is transmitted to a user terminal and approval is received.

Figure 24:
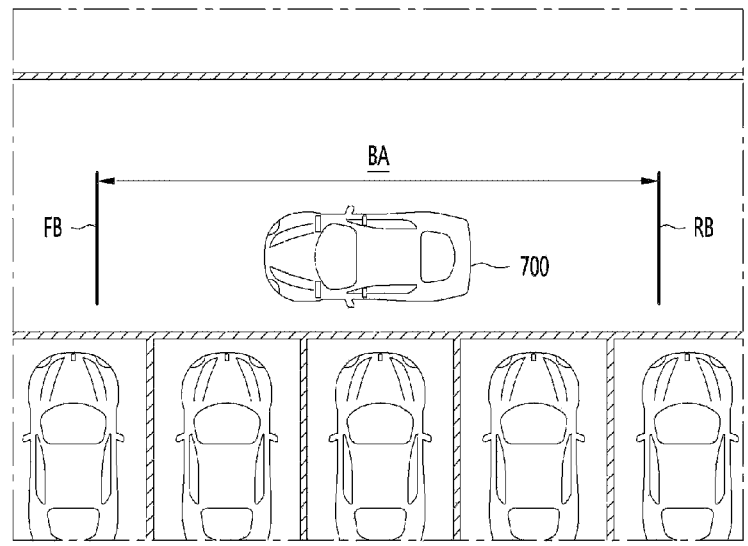
FIG. 24 is a diagram for explaining a stopped-vehicle movement range according to an embodiment.

Referring to FIG. 24, it may be seen that the stopped-vehicle movement range is designated to be between the front movement limit line FB and the rear movement limit line RB. In this instance, the process of moving the stopped vehicle 700 in a stopped-vehicle movement mode in order to permit a vehicle of another person to be moved is described.

Figure 23:
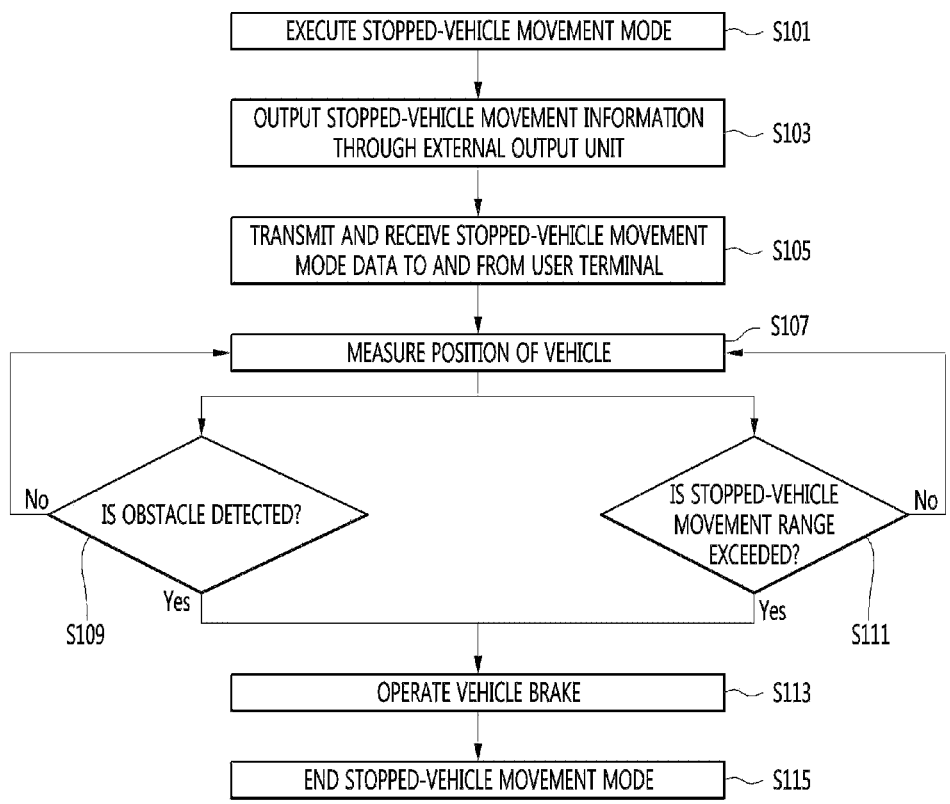
FIG. 23 is a flowchart of the process of providing a stopped-vehicle movement mode according to an embodiment.

Referring to FIG. 23, firstly, the processor 170 may determine whether the stopped-vehicle movement mode is required, and execute the stopped-vehicle movement mode when the stopped-vehicle movement mode is required, in step S101.

Specifically, the processor 170 may execute the stopped-vehicle movement mode when a request for the movement of the stopped vehicle 700 is input through the external input unit 113.

Also, when a physical force from other people that is equal to or greater than a certain value is sensed near the trunk or emblem, the processor 170 may detect it as a movement request signal for the stopped vehicle 700 and execute the stopped-vehicle movement mode.

Also, when there is a request for the movement of the stopped vehicle 700, the processor 170 may transmit a request signal to a user terminal as shown in FIG. 9 and may or may not execute the stopped-vehicle movement mode according to the response from the user terminal. In this instance, stopped-vehicle movement information is together transmitted, so it may assist a user in recognizing the situation.

Also, when a stopped-vehicle movement mode execution signal is received from the user terminal, the processor 170 may authenticate the user terminal and execute the stopped-vehicle movement mode after the authentication of the terminal.

Next, when the stopped-vehicle movement mode is executed, the processor 170 may output stopped-vehicle movement information through the external output unit 180, in step S103.

Specifically, the processor 170 may display the stopped-vehicle movement information on the external display unit 181. Also, since the stopped-vehicle movement information is also output as an audio signal through the external audio output unit 182, it is possible to supplement the information displayed on the external display unit 181.

For example, the processor 170 may display a notification of the execution of the stopped-vehicle movement mode and provide an image as shown in FIG. 24 to display the stopped-vehicle movement range.

Figure 25:
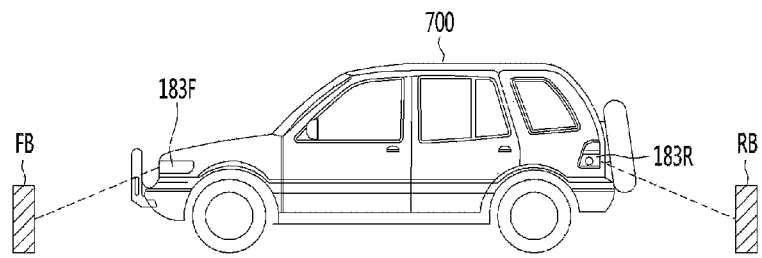
FIG. 25 represents how a laser output unit according to an embodiment displays a stopped-vehicle movement range.

Also, the processor 170 may also irradiate the road surface with a laser through the laser output unit 183 to display the stopped-vehicle movement range. In this instance, the laser output unit 183 may also display a circle as the stopped-vehicle movement range on the entire road surface (see FIG. 8) or display only the front limit line FB and the rear limit line RB as shown in FIG. 25.

In addition, when the stopped-vehicle movement mode is executed, the processor 170 may continuously transmit stopped-vehicle movement information according to the execution of the stopped-vehicle movement mode in step S105.

For example, the processor 170 may transmit, to the user terminal, an around view monitor image that is an image around the vehicle including the stopped vehicle 700, and the user may check through the terminal in real time whether the vehicle safely moves, as shown in FIG. 11. In this instance, the processor 170 may cancel the execution of the stopped-vehicle movement mode through the terminal to operate the brake, when the user determines that vehicle movement is dangerous.

The processor 170 may continuously measure the position of the stopped vehicle 700 during the execution of the stopped-vehicle movement mode in step S107.

For example, the processor 170 may accurately measure the position of the stopped vehicle 700 through image information obtained through the camera 160, sensor information or navigation information obtained through the interface unit 130 and/or information obtained from the communication unit 120.

Next, the processor 170 may sense an obstacle that may collide with the stopped vehicle, near the stopped vehicle 700 in step S109.

In addition, when an obstacle that is more likely to collide with the stopped vehicle is sensed and the position of the obstacle is within a certain distance, the processor 170 may operate the brake to perform an AEB function in step S113.

The processor 170 may measure the distance to the obstacle present in the movement direction of the stopped vehicle 700 through the sensor unit 150, and when the distance between the obstacle and the stopped vehicle 700 is within a certain distance, the processor 170 may operate the brake so that the stopped vehicle 700 brakes. Thus, the processor 170 may provide the AEB function in a stopped-vehicle movement mode to safely move the stopped vehicle 700.

Next, the processor 170 may measure the position of the stopped vehicle 700 and detect whether the measured position exceeds a stopped-vehicle movement range, in step S111.

In addition, when it is detected that the measured position is out of the stopped-vehicle movement range, the processor 170 may operate the brake to prohibit the stopped vehicle 700 from moving in step S113.

Figure 26:
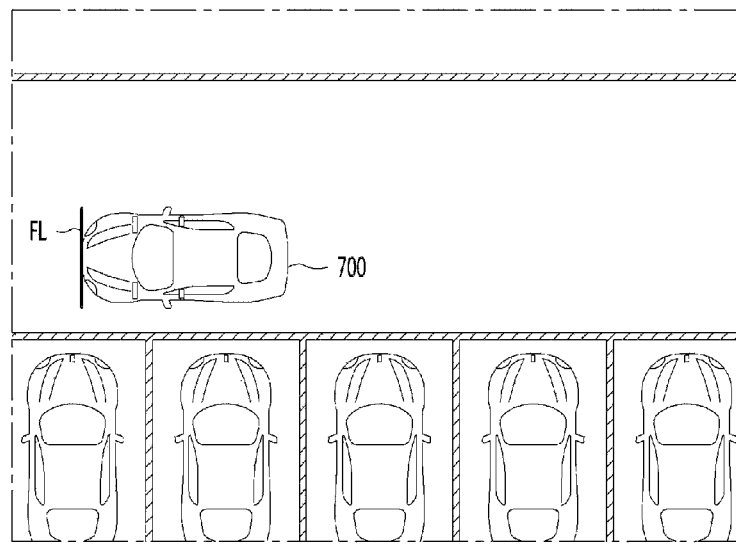
FIG. 26 is a diagram for explaining a stopped-vehicle movement range excess brake function according to an embodiment.

Referring to FIG. 26, when the stopped vehicle 700 moves forward and thus to the front movement limit line FB, the processor 170 may turn on the brake so that the stopped vehicle 700 no longer moves.

Likewise, when the stopped vehicle 700 moves backward and thus to the rear movement limit line RB, the processor 170 may turn on the brake so that the stopped vehicle 700 no longer moves.

If other people want to move the stopped vehicle 700 to the outside of the stopped-vehicle movement range, it is possible to request for the change of the stopped-vehicle movement range through the external input unit 113 and the stopped-vehicle movement range may be reset according to user terminal's approval.

Next, the processor 170 may end a stopped vehicle 700 movement mode when the stopped vehicle 700 movement mode is executed and the position of the stopped vehicle 700 does not change for a preset time, in step S115.

After the stopped-vehicle movement mode ends, the processor 170 may return the stopped vehicle 700 to the position of the stopped vehicle 700 before the execution of the stopped-vehicle movement mode.

Alternatively, after the stopped-vehicle movement mode ends, the processor 170 may scan a safe parking space and automatically park a vehicle in the scanned parking space.

As such, the stopped-vehicle movement mode may enable other people to easily and safely move a stopped vehicle to a desired position as needed and the user of the stopped vehicle 700 may also avoid the inconvenience of personally moving to the vehicle in order for the vehicle to be moved.

Figure 27:
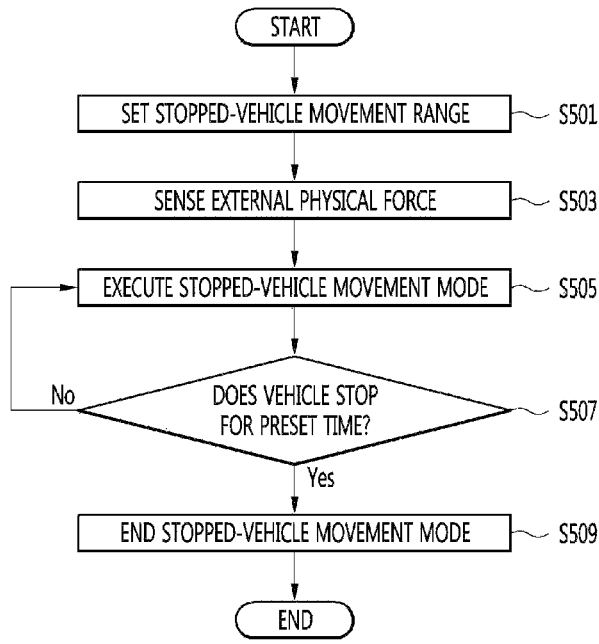
FIG. 27 is a flowchart of the method of moving a vehicle by using a stopped-vehicle movement mode according to an embodiment.

In the following, an embodiment where other people move the vehicle by using such a stopped-vehicle movement mode is described with reference to FIGS. 27 and 28.

Firstly, the user may perform parallel parking that obstructs the passage of another vehicle, due to a lack of a parking space.

In this instance, in order to prevent the inconvenience of personally moving the stopped vehicle 700 to permit the passage of the other vehicle, the user may set the stopped-vehicle movement mode to enable other people to move the previously stopped vehicle.

To this end, the user may set a stopped-vehicle movement range in step S501.

For example, the user may set the stopped-vehicle movement range by moving the stopped vehicle 700 to a front movement acceptance position and then designating a corresponding position as the front movement limit line FB and moving the stopped vehicle to a rear movement acceptance position and then designating a corresponding position as the rear movement limit line RB.

Then, the stopped vehicle 700 may sense a physical force that other people use to move the vehicle in step S503.

Figure 28:
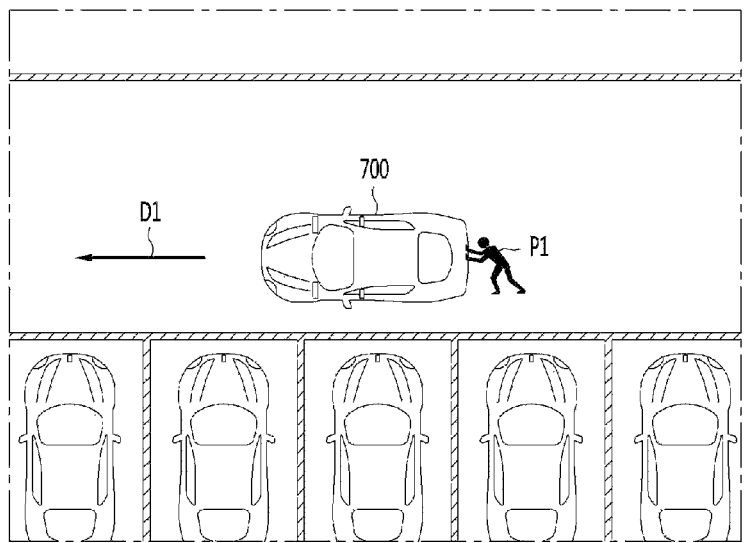
FIG. 28 represents an example of FIG. 27.

Specifically, referring to FIG. 28, other people P1 may attempt to push the vehicle's trunk to move the stopped vehicle 700.

When the external physical force is equal to or greater than a certain value, it may be considered that there is an attempt to move the stopped vehicle 700, and it is possible to execute a stopped-vehicle movement mode in step S505.

When the stopped-vehicle movement mode is executed, the brake of the stopped vehicle 700 may be released, the stopped vehicle may move within the stopped-vehicle movement range, an AEB function may be executed, stopped-vehicle movement information may be output through the external output unit 180, and the user may check through his or her terminal that the stopped vehicle 700 moves.

After pushing the vehicle to move it to a desired position during the execution of the stopped-vehicle movement mode, other people may drive their vehicles out of previously blocked parking spaces.

When the stopped vehicle 700 stops for a preset time after the execution of the stopped-vehicle movement mode, the stopped vehicle 700 may consider that other people no longer need to move the vehicle, and end the stopped-vehicle movement mode, in steps S507 and S509.

Through these processes, other people may safely move the stopped vehicle 700 to a desired position without a user and the user does not need to go to the stopped vehicle 700 to move the vehicle.

In the following, another embodiment where other people move the vehicle by using a stopped-vehicle movement mode is described with reference to FIGS. 29 to 31.

Firstly, the user may perform parking that obstructs the passage of another vehicle, due to a lack of a parking space.

In this instance, in order to prevent the inconvenience of personally moving the stopped vehicle 700 for the passage of the other vehicle, the user may set the stopped-vehicle movement mode to enable other people to move the previously stopped vehicle.

That is, the user may set a stopped-vehicle movement range. Alternatively, the stopped-vehicle movement range may be automatically set by the processor 170 after stopping or by default in step S701.

Then, the user may receive a request for the movement of the stopped vehicle 700 from other people in step S703.

Specifically, referring to FIG. 30, when other people sees the front windshield W of the stopped vehicle 700 in order to call the user of the stopped vehicle 700, stopped-vehicle movement information is displayed through the external touch screen 181, 113 on the front windshield W and other people may touch the external touch screen 181, 113 to request for the movement of the stopped vehicle 700 from the user.

When other people input the execution of the stopped-vehicle movement mode, the stopped-vehicle movement mode may be executed in step S705.

In this instance, only when there is approval from the terminal of the user may the stopped-vehicle movement mode also be executed.

When the stopped-vehicle movement mode is executed, the brake of the stopped vehicle 700 may be released, the stopped vehicle may move within the stopped-vehicle movement range, an AEB function may be executed, stopped-vehicle movement information may be output through the external output unit 180, and the user may check through his or her terminal that the stopped vehicle 700 moves.

Also, when the stopped-vehicle movement mode is executed, the external output unit 180 and the external input unit 113 may provide a stopped-vehicle 700 movement interface for moving the stopped vehicle 700 in step S707.

Specifically, referring to FIG. 31, the external output unit 180 and the external input unit 113 may be a touch screen, and it is possible to provide the stopped-vehicle 700 movement interface by providing a movement key to the touch screen.

That is, other people may touch a forward movement key, a backward movement key or a wheel direction key to move the stopped vehicle 700.

In this instance, since other people control the stopped vehicle 700 through the touch screen present on the front windshield W, they may be located at the side of the stopped vehicle 700 as shown in FIG. 31.

The side region of the front windshield W at which other people are located is designated as the dead zone DZ, so the AEB function may not be operated by other people.

After moving the stopped vehicle 700 to a desired position through the stopped-vehicle 700 movement interface during the execution of the stopped-vehicle movement mode, other people may drive their vehicles out of previously blocked parking spaces.

When the stopped vehicle 700 stops for a preset time after the execution of the stopped-vehicle movement mode, the stopped vehicle 700 may consider that other people no longer need to move the vehicle, and end the stopped-vehicle movement mode, in steps S709 and S711.

Through these processes, other people may safely and easily move the stopped vehicle 700 to a desired position without a user and the user does not need to personally move to the stopped vehicle 700 to move the vehicle.

Figure 32:
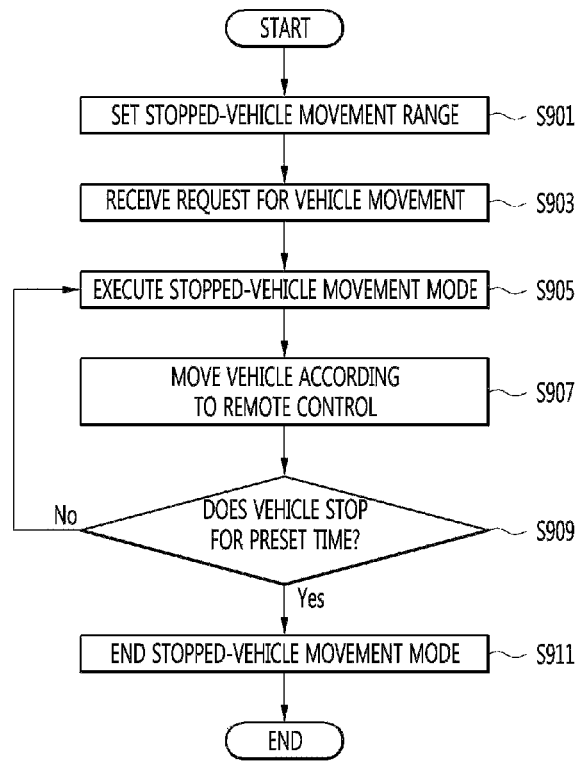
FIG. 32 is a flowchart of the method of moving a vehicle by using a stopped-vehicle movement mode according to still another embodiment.

In the following, still another embodiment where other people move the vehicle by using a stopped-vehicle movement mode is described with reference to FIGS. 32 and 33.

Firstly, the user may perform parking that obstructs the passage of another vehicle, due to a lack of a parking space. In this instance, in order to prevent the inconvenience of personally moving the stopped vehicle 700 for the passage of the other vehicle, the user may set the stopped-vehicle movement mode to enable other people to move the previously stopped vehicle.

That is, the user may set a stopped-vehicle movement range. Alternatively, the stopped-vehicle movement range may be automatically set by the processor 170 after stopping or by default in step S901.

Then, the user may receive a request for the movement of the stopped vehicle 700 from other people in step S903.

Specifically, when other people see the front windshield W of the stopped vehicle 700 in order to call the user of the stopped vehicle 700, stopped-vehicle movement information is displayed on the front windshield W and other people may touch the front windshield W to request for the movement of the stopped vehicle 700 from the user.

When other people input the execution of the stopped-vehicle movement mode, the stopped-vehicle movement mode may be executed in step S905.

When the stopped-vehicle movement mode is executed, a remote control interface may be executed, the stopped vehicle may move within the stopped-vehicle movement range, an AEB function may be executed, stopped-vehicle movement information may be output through the external output unit 180, and the user may check through his or her terminal that the stopped vehicle 700 moves.

Figure 33:
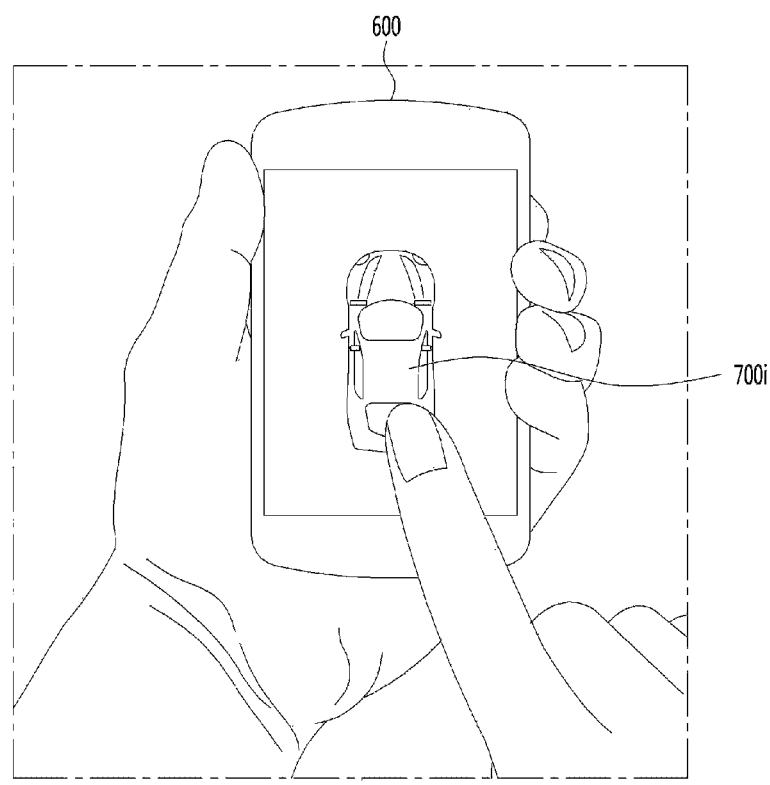
FIG. 33 is a diagram for explaining FIG. 32.

Specifically, referring to FIG. 33, the user may move the stopped vehicle 700 remotely through a user terminal in step S907.

Specifically, stopped-vehicle movement information may be displayed through the user terminal and the stopped vehicle 700 may move by receiving a remote control signal input by the user terminal.

For example, a real-time around view image is transmitted from the stopped vehicle 700 to the user and the user may drag a virtual image 700i of the stopped vehicle 700 to a desired position to move the stopped vehicle 700 to the drag position.

Other people may pick their vehicles out when the stopped vehicle 700 move through the remote control interface.

When the stopped vehicle 700 stops for a preset time after the execution of the stopped-vehicle movement mode, the stopped vehicle 700 may consider that other people no longer need to move the vehicle, and end the stopped-vehicle movement mode, in steps S909 and S911.

Through these processes, other people may move the stopped vehicle 700 to a desired position, and the user may move the stopped vehicle 700 remotely without moving to the vehicle.

Figure 34:
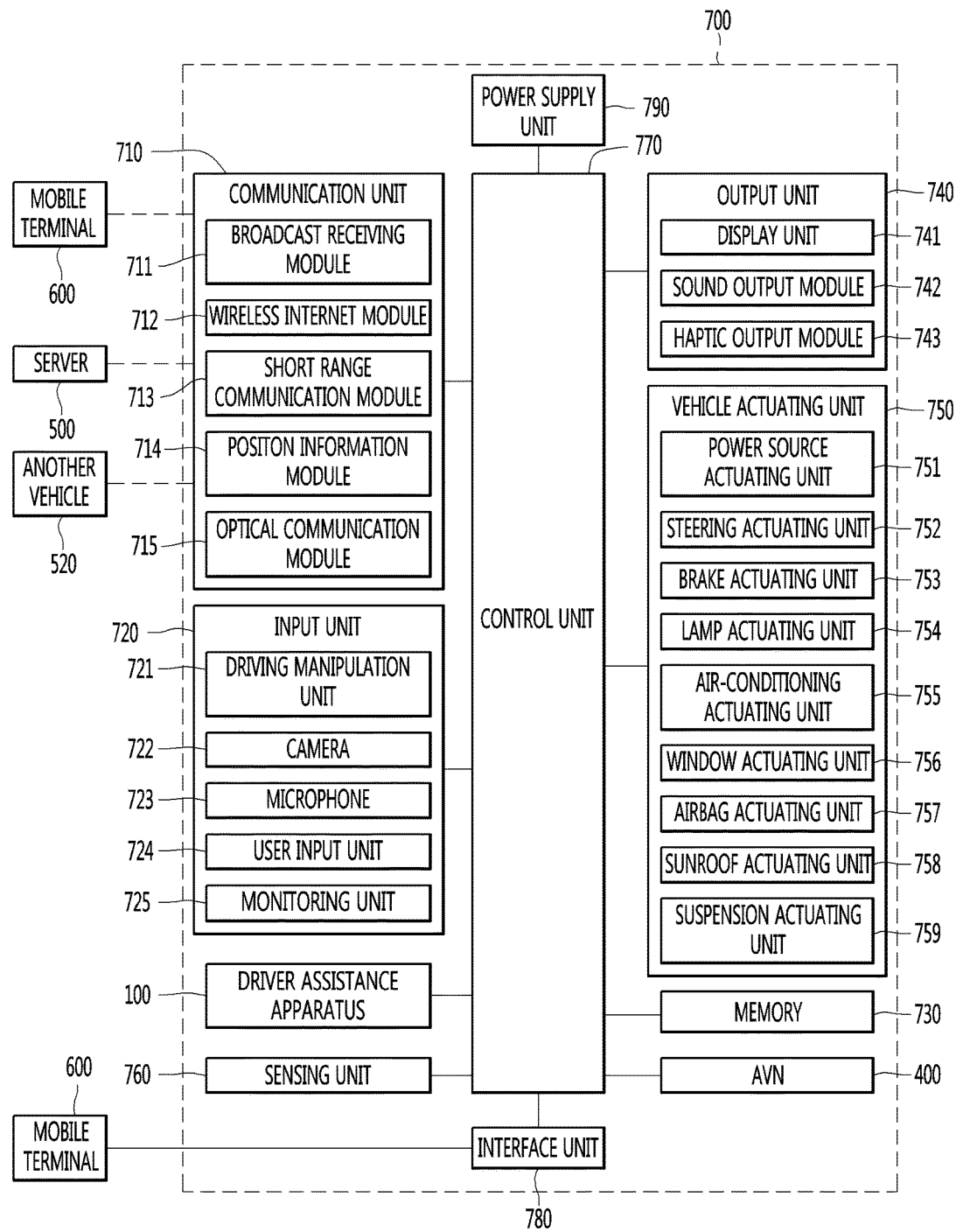
FIG. 34 is an example of an internal block diagram of the vehicle of FIG. 1.

FIG. 34 is an example of an internal block diagram of the vehicle of FIG. 1.

Such a driver assistance apparatus may be included in the vehicle 700.

The vehicle may include a communication unit 710, an input unit 720, a sensor unit 760, an output unit 740, a vehicle actuating unit 750, a memory 730, an interface unit 780, a control unit 770, a power supply unit 790, a driver assistance apparatus 100, and an AVN apparatus 400.

The communication unit 710 may include one or more modules that enable wireless communication between the vehicle and the mobile terminal 600, between the vehicle 700 and an external sever 510, or between the vehicle 700 and another vehicle 520. Also, the communication unit 710 may include one or more modules that connect the vehicle to one or more networks.

The communication unit 710 may include a broadcast receiving module 711, a wireless internet module 712, a short-range communication module 713, a position information module 714, and an optical communication module 715.

The broadcast receiving module 711 receives a broadcast signal or broadcast related information from an external broadcast management server through a broadcast channel. In this example, a broadcast include a radio or TV broadcast.

The wireless internet module 712 indicates a module for wireless internet access and may be built into or external to the vehicle. The wireless internet module 712 is configured to transmit/receive a wireless signal in a communication network according to wireless internet technologies.

The wireless internet technology may include Wireless LAN (WLAN), Wireless-Fidelity (Wi-Fi), Wi-Fi Direct, DIGITAL LIVING NETWORK ALLIANCE (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A), and the wireless internet module 712 transmits/receives data according to at least one wireless internet technology including internet technologies not listed above. For example, the wireless internet module 712 may exchange data with the external server 510 wirelessly. The wireless internet module 712 may receive weather information or road traffic information (e.g., TPEG) from the external server 510.

The short-range communication module 713 may support short-range communication by using at least one of BLUETOOTH®, Radio Frequency Identification (RFID), INFRARED DATA ASSOCIATION (IrDA), Ultra Wideband (UWB), ZIGBEE, Near Field Communication (NFC), Wireless-Fidelity (Wi-Fi), Wi-Fi Direct, and Wireless Universal Serial Bus (Wireless USB) technologies.

Such a short-range communication module 713 may form a Wireless Area Network (WAN) to perform short-range communication between the vehicle and at least one external device. For example, the short-range communication module 713 may exchange data with the mobile terminal 600. The short-range module 713 may receive weather information or road traffic information (e.g., TPEG) from the mobile terminal 600. If a user gets in the vehicle, the mobile terminal 600 of the user and the vehicle may perform pairing on each other automatically or by the execution of an application by the user.

The position information module 714 is a module for acquiring the position of the vehicle and includes a GPS module as a typical example. For example, the vehicle may use a signal transmitted by a GPS satellite to acquire the position of the vehicle, when the GPS module is used.

The optical communication module 715 may include a light transmission unit and a light reception unit.

The light reception unit may convert a light signal into an electrical signal to receive information. The light reception unit may include a photo diode (PD) for receiving light. The PD may convert light into an electrical signal. For example, the light reception unit may receive information on the front vehicle through light emitted from a light source that is included in the front vehicle.

The light transmission unit may include at least one light-emitting element for converting an electrical signal into a light signal. In this example, the light-emitting element may be a light-emitting diode (LED). The light transmission unit may convert an electrical signal into a light signal to transmit the light signal to the outside. For example, the light transmission unit may transmit the light signal to the outside through the on/off of the light-emitting element corresponding to a predetermined frequency. According to an embodiment, the light transmission unit may include a plurality of light-emitting element arrays. According to an embodiment, the light transmission unit may be integrated into a lamp that is installed at the vehicle. For example, the light transmission unit may be at least one of a headlight, a taillight, a stop lamp, a turn signal, and a sidelight. For example, the optical communication module 715 may exchange data with the other vehicle 520 through optical communication.

The input unit 720 may include the driving manipulation means 721, a camera 195, a microphone 723, and a user input unit 724.

The driving manipulation means 721 receives a user input for driving the vehicle. Referring to FIG. 3, the driving manipulation means 721 may include the steering input means 721A, a shift input means 721D, an acceleration input means 721C, and a brake input means 721B.

The steering input means 721A receives an input for the driving direction of the vehicle from a user. The steering input means 721A may be formed in the form of a wheel so that a steering input may be performed by rotation. According to an embodiment, the steering input means 721A may also be formed as a touch screen, touch pad or button.

The shift input means 721D receives an input for the parking P, driving D, neutrality N, and reverse movement R of the vehicle from the user. The shift input means 721D may be formed in the form of a lever. According to an embodiment, the shift input means 721D may also be formed as a touch screen, touch pad or button.

The acceleration input means 721D receives an input for the acceleration of the vehicle from the user. The brake input means 721B receives an input for the speed decrease of the vehicle from the user. The acceleration input means 721C and the brake input means 721B may be formed in the form of pedals. According to an embodiment, the acceleration input means 721C or the brake input means 721B may also be formed as a touch screen, touch pad or button.

The camera 722 may include an image sensor and an image processing module. The camera 722 may process a still image or video that is obtained by an image sensor (e.g., CMOS or CCD). The image processing module may process the still image or video acquired by the image sensor to extract necessary information and transmit the extracted information to the processor 770. The vehicle may include the camera 722 that captures images in front of the vehicle or images around the vehicle, and the monitoring unit 725 that captures an image of the interior of the vehicle.

The monitoring unit 725 may acquire an image of a passenger. The monitoring unit 725 may acquire the image of the passenger for biometrics.

Although FIG. 34 shows that the monitoring unit 725 and the camera 722 are included in the input unit, the camera 722 may also be included in the driver assistance apparatus as described above.

The microphone 723 may process an external sound signal into electrical data. The processed data may be used in various methods according to a function that is executed at the vehicle. The microphone 723 may convert a user's voice command into electrical data. The electrical data obtained through conversion may be transmitted to the control unit 770.

According to an embodiment, the camera 722 or the microphone 723 may also be a component that is included in the sensing unit 760, and not in the input unit 720.

The user input unit 724 receives information from the user. When information is input through the user input unit 724, the control unit 770 may control the operation of the vehicle corresponding to the input information. The user input unit 724 may include a touch-type input means or mechanical input means. According to an embodiment, the user input unit 724 may be disposed at a region of a steering wheel. In this instance, a driver may manipulate the user input unit 724 with his or her finger, holding the steering wheel.

The sensing unit 760 senses a signal relating to the driving of the vehicle. To this end, the sensing unit 760 may include a wheel sensor, a speed sensor, a tilt sensor, a weight sensor, a heading sensor, a yaw sensor, a gyro sensor, a position module, a vehicle forward/backward movement sensor, a battery sensor, a fuel sensor, a tire sensor, a steering sensor sensing steering wheel rotation, a vehicle temperature sensor, a vehicle humidity sensor, an ultrasonic sensor, a radar, a Lidar, and so on.

Thus, the sensing unit 760 may acquire sensing signals for vehicle collision information, vehicle direction information, vehicle position information (GPS information), vehicle angle information, vehicle speed information, vehicle acceleration information, vehicle tilt information, vehicle forward/backward movement information, battery information, fuel information, tire information, vehicle lamp information, vehicle temperature information, vehicle humidity information, steering wheel rotation angle, and so on.

The sensing unit 760 may further include an acceleration pedal sensor, a barometric pressure sensor, an engine speed sensor, an Air Flow Sensor (AFS), an Air Temperature Sensor (ATS), a Water Temperature Sensor (WTS), a Throttle Position Sensor (TPS), a TDC sensor, a Crank Angle Sensor (CAS), and so on.

The sensing unit 760 may include a biometric recognition information sensing unit. The biometric recognition information sensing unit senses and acquires biometric recognition information on a passenger. The biometric recognition information may include fingerprint information, iris-scan information, retina-scan information, hand geometry information, facial recognition information, and voice recognition information. The biometric recognition information sensing unit may include a sensor that senses biometric recognition information of the passenger. In this instance, the monitoring unit 725 and the microphone 723 may operate as sensors. The biometric recognition information sensing unit may acquire hand geometry information and facial recognition information through the monitoring unit 725.

The output unit 740 is used for outputting information processed by the control unit 770 and may include the display unit 741, the sound output unit 742, and the haptic output unit 743.

The display unit 741 may display information processed by the control unit 770. For example, the display unit 741 may display vehicle related information. In this example, the vehicle related information may include vehicle control information for direct control over the vehicle or driver assistance information for a driving guide for a driver. Also, the vehicle related information may include vehicle state information that indicates the current state of the vehicle, or vehicle operation information relating to the operation of the vehicle.

The display unit 741 may include at least one of an LCD, a TFT LCD, an OLED, a flexible display, a 3D display, and an e-ink display.

The display unit 741 may form a mutual layer structure with a touch sensor or be integrally formed to implement a touch screen. The touch screen may function as the user input unit that provides an input interface between the vehicle and the user, and also provide an output interface between the vehicle and the user. In this instance, the display unit 741 may include a touch sensor sensing a touch of the display unit 741 to be capable of receiving a control command by the touch. Accordingly, when the display unit 741 is touched, the touch sensor senses the touch, and the control unit 770 may generate, based on the touch, a control command corresponding to the touch. A thing input by the touch may be a letter, a number, or a menu item that may be instructed or designated in various modes.

The display unit 741 may include a cluster so that a driver may see vehicle state information or vehicle operation information simultaneously with driving. The cluster may be located on the dashboard. In this instance, the driver may see information displayed on the cluster, while maintaining a forward view.

According to an embodiment, the display unit 741 may be implemented as a HUD. When the display unit 741 is implemented as the HUD, it is possible to output information through a transparent display that is installed on the windshield. Alternatively, the display unit 741 may include a projection module to output information by using an image that is projected onto the windshield.

The sound output unit 742 converts an electrical signal from the control unit 770 into an audio signal and outputs the audio signal. To this end, the sound output unit 742 may include a speaker and so on. The sound output unit 742 may also output sound corresponding to the operation of the user input unit 724.

The haptic output unit 743 generates a haptic output. For example, the haptic output unit 743 may enable a steering wheel, a safety belt and a seat to vibrate so that a user may recognize an output.

The vehicle actuating unit 750 may control the operations of various apparatuses of the vehicle. The vehicle actuating unit 750 may include a power source actuating unit 751, a steering actuating unit 752, a brake actuating unit 753, a lamp actuating unit 754, an air-conditioning actuating unit 755, a window actuating unit 756, an airbag actuating unit 757, a sunroof actuating unit 758, and a suspension actuating unit 759.

The power source actuating unit 751 may perform electronic control over the power source in the vehicle.

For example, when the power source is a fossil fuel based engine, the power source actuating unit 751 may perform electronic control over the engine. Thus, it is possible to control the output torque of the engine. When the power source actuating unit 751 is the engine, it is possible to restrict the output torque of the engine to restrict the speed of the vehicle.

As another example, when the power source is an electricity based motor, the power source actuating unit 751 may control the motor. Thus, it is possible to control the speed, torque and so on of the motor.

The steering actuating unit 752 may perform electronic control over a steering apparatus in the vehicle. Thus, it is possible to change the driving direction of the vehicle.

The brake actuating unit 753 may perform electronic control over a brake apparatus in the vehicle. For example, it is possible to control the operation of a brake installed at a wheel to decrease the speed of the vehicle. As another example, by enabling brakes disposed at the left wheel and the right wheel respectively to perform different operations, it is possible to adjust the driving direction of the vehicle to the left or to the right.

The lamp actuating unit 754 may control the turn on/off of lamps that are disposed inside and outside the vehicle. Also, it is possible to control the intensity, direction and so on of light emitted from the lamp. For example, it is possible to control a turn signal lamp, a brake lamp, and so on.

The air-conditioning actuating unit 755 may perform electronic control over an air conditioner in the vehicle. For example, when the temperature inside the vehicle is high, it is possible to operate the air conditioner so that cold air is supplied into the vehicle.

The window actuating unit 756 may perform electronic control over a window apparatus in the vehicle. For example, it is possible to open or close left and right windows of the vehicle.

The airbag actuating unit 757 may perform electronic control over an airbag apparatus in the vehicle. For example, it is possible to operate an airbag in a risky situation.

The sunroof actuating unit 758 may perform electronic control over a sunroof apparatus in the vehicle. For example, it is possible to open or close the sunroof.

The suspension actuating unit 759 may perform electronic control over a suspension apparatus in the vehicle. For example, when the road surface is uneven, it is possible to control a suspension apparatus to reduce the vibration of the vehicle.

The memory 730 is electrically connected to the control unit 770. The memory 770 may store fundamental data on units, control data for operation control over the units, and input and output data. The memory 790 may be various storage devices, such as a ROM, RAM, EPROM, flash drive, and hard drive that are hardware. The memory 730 may store various pieces of data for the overall operations of the vehicle, such as programs for processing or controlling by the control unit 770.

The interface unit 780 may function as a path to various kinds of external devices that are connected to the vehicle. For example, the interface unit 780 may include a port connectable to the mobile terminal 600 and be connected to the mobile terminal 600 through the port. In this instance, the interface unit 780 may exchange data with the mobile terminal 600.

The interface unit 780 may function as a path through which electrical energy is supplied to the mobile terminal 600. When the mobile terminal 600 is electrically connected to the interface unit 780, the interface unit 780 supplies electrical energy supplied from the power supply unit 790 to the mobile terminal 600 according to the control of the control unit 770.

The control unit 770 may control the overall operation of each unit in the vehicle. The control unit 770 may be named an electronic control unit (ECU).

Such a control unit 770 may execute a function corresponding to a transmitted signal, according to the execution signal transmission of the driver assistance apparatus 100.

The control unit 770 may be implemented by using at least one of an ASIC, a DSP, a DSPD, a PLD, an FPGA, a processor, a controller, a micro-controller, a microprocessor, and other electrical units for executing functions.

The control unit 770 may perform the role of the above-described processor 170. That is, the processor 170 of the driver assistance apparatus 100 may be set directly to the control unit 770 of the vehicle. In such an embodiment, it may be understood that the driver assistance apparatus 100 refers to some components of the vehicle.

Alternatively, the control unit 770 may also control components to transmit information requested by the processor 170.

The power supply unit 790 may supply power required for the operation of each component according to the control of the control unit 770. In particular, the power supply unit 770 may receive power from a battery in the vehicle.

The AVN apparatus 400 may exchange data with the control unit 770. The control unit 770 may receive navigation information from the AVN apparatus 400 or a separate navigation apparatus. In this example, the navigation information may include set destination information, route information according to the destination, vehicle driving related map information, or vehicle position information.

Since the driver assistance apparatus according to an embodiment proposes a function necessary for a user depending on a driving situation, that maintains the user's driving attention, and may be easily performed, there are advantages in that safe driving is possible and it is possible to increase the convenience of the driver.

Specifically, the driver assistance apparatus according to an embodiment may enhance driving safety by providing a partial self-driving function.

Also, since the driver assistance apparatus according to an embodiment may receive an execution input through a gesture input unit, a user may easily perform various execution inputs, maintaining driving attention.

Also, the driver assistance apparatus according to an embodiment proposes a necessary function through a display unit, in which case the driver assistance apparatus enables a convenience function to be intuitively understood with a simple display and also enhances driving safety because the user may keep eyes forward.

According to a method of providing the stopped-vehicle movement mode according to an embodiment, it is possible to safely and easily move the vehicle to a desired position without a user outside the vehicle.

Also, since the user does not need to return to the stopped vehicle to move the vehicle, user convenience may increase.

Also, since the stopped-vehicle movement range is set and the vehicle moves only within the stopped-vehicle movement range, it is possible to prevent vehicle theft or loss and allow vehicle movement only within a safe region.

Also, since such a stopped-vehicle movement range may be automatically set, user convenience may be enhanced.

Also, it is possible to enhance security by further including a user terminal approval process when the stopped-vehicle movement mode is executed.

Also, it is possible to prevent collision with an obstacle by the execution of the AEB function during the stopped-vehicle movement mode.

In this instance, it is possible to smoothly move the vehicle by predicting the positions of other people who move the vehicle, and setting the predicted positions as dead zones.

Also, the AEB function may also operate even when the vehicle moves backward.

Also, it is possible to increase user convenience by providing a remote control interface that moves the vehicle through the user terminal.

Also, when other people move the vehicle, an around view image is displayed on the user terminal through the communication unit so that the user may check the movement state of his or her vehicle.

Also, through a call mode provided in the stopped-vehicle movement mode, privacy may be protected without leaking information on the user terminal and other people may easily communicate with the user through the stopped-vehicle.

Also, the external output unit that displays stopped-vehicle movement information may help other people to intuitively understand how to move the stopped vehicle.

Also, it is possible to provide a stopped-vehicle movement interface that may move the vehicle outside.

Also, it is possible to safely park the vehicle by scanning a safe parking space after the end of the stopped-vehicle movement mode and automatically parking the vehicle in the scanned parking space.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A driver assistance apparatus comprising:
   a sensor to detect an obstacle around a vehicle;
   a memory configured to store a stopped-vehicle movement range;
   a brake driving controller configured to turn on or off a vehicle brake; and
   a processor configured to:
   cause the vehicle to move by transmitting a control signal to a controller of the vehicle,
   provide a stopped-vehicle movement mode in which the vehicle is permitted to move by an external force applied to the vehicle or an auxiliary power source of the vehicle when a driver is not in the vehicle in a state in which the vehicle is stopped and an ignition is off,
   control the brake driving controller to turn off the vehicle brake and maintain the vehicle in a neutral gear when the stopped-vehicle movement mode is executed, and
   control the brake driving controller to turn on the vehicle brake based on at least one of an obstacle detected around the vehicle and the stopped-vehicle movement range in the stopped-vehicle movement mode.

2. The driver assistance apparatus according to claim 1, wherein the processor is configured to set the stopped-vehicle movement range as a range input by a user.

3. The driver assistance apparatus according to claim 1, further comprising a camera to obtain an image of an area outside of the vehicle,
wherein the processor is configured to set the stopped-vehicle movement range according to the image.

4. The driver assistance apparatus according to claim 1, further comprising a communication circuit configured to exchange data related to the vehicle with a terminal,
wherein the processor is configured to authenticate a connected user terminal through the communication circuit and reset the stopped-vehicle movement range according to a request from an authenticated user terminal.

5. The driver assistance apparatus according to claim 1, wherein the processor is configured to turn on the vehicle brake when an obstacle is detected from a movement direction of the vehicle.

6. The driver assistance apparatus according to claim 1, wherein the processor is configured to designate a region around the vehicle as a dead zone and turn off the vehicle brake when an obstacle is detected in the dead zone.

7. The driver assistance apparatus according to claim 6, wherein the dead zone is a region adjacent to the vehicle where a person moving the vehicle is located.

8. The driver assistance apparatus according to claim 1, further comprising a communication circuit configured to exchange data with a terminal,
wherein the processor is configured to authenticate a connected user terminal through the communication circuit and execute another stopped-vehicle movement mode in which a person controls the vehicle according to a request from an authenticated user terminal.

9. The driver assistance apparatus according to claim 8, further comprising a camera to obtain surrounding images that are obtained by capturing images around the vehicle,
wherein the processor is configured to transmit the captured surrounding images to the user terminal in the stopped-vehicle movement mode.

10. The driver assistance apparatus according to claim 1, further comprising a communication circuit configured to exchange data with a terminal,
wherein the processor is configured to authenticate a connected user terminal through the communication circuit and execute a remote stopped-vehicle movement mode in which the vehicle is controlled according to a request from an authenticated user terminal.

11. The driver assistance apparatus according to claim 1, further comprising a communication circuit configured to exchange data with a terminal,
wherein the processor is configured to provide a call between the user terminal and a location outside of the vehicle through the communication circuit.

12. The driver assistance apparatus according to claim 1, further comprising an external output to output stopped-vehicle movement information outside of the vehicle.

13. The driver assistance apparatus according to claim 12, wherein the external output comprises an external display disposed at at least one of a front windshield of the vehicle and a trunk of the vehicle to display the stopped-vehicle movement information.

14. The driver assistance apparatus according to claim 13, wherein the external display is configured to display an around view monitor image that displays images of all directions of the vehicle.

15. The driver assistance apparatus according to claim 13, wherein the external display is configured to display a movement key to control the vehicle movement, and
wherein the movement key comprises a forward movement key for moving the vehicle forward, a backward movement key for moving the vehicle backward, and a direction key for controlling a wheel direction of the vehicle.

16. The driver assistance apparatus according to claim 12, further comprising an external input unit disposed on the external output to sense an external input for executing and controlling the stopped-vehicle movement mode.

17. The driver assistance apparatus according to claim 16, wherein the external output comprises an external audio output,
wherein the external input comprises an external microphone, and
wherein the processor is configured to provide a call with the user terminal through the external audio output and the external microphone.

18. The driver assistance apparatus according to claim 12, wherein the stopped-vehicle movement information comprises at least one of a notification of the execution of the stopped-vehicle movement mode, the stopped-vehicle movement range, and a notification of who is responsible for the vehicle movement.

19. The driver assistance apparatus according to claim 12, wherein the external output comprises a laser, and
wherein the laser is configured to display the stopped-vehicle movement range on a road surface.

20. The driver assistance apparatus according to claim 1, wherein the processor is configured to control the vehicle to move back to an originally stopped position after the stopped-vehicle movement mode ends.

21. The driver assistance apparatus according to claim 1, wherein the processor is configured to scan a parking space after an end of the stopped-vehicle movement mode, and perform automatic parking of the vehicle into the parking space.

22. The driver assistance apparatus according to claim 1, wherein the processor is configured to control the vehicle to apply the vehicle brake when a certain time elapses from when the stopped-vehicle movement mode ends.

23. A vehicle comprising:
a driver assistance apparatus including:
a sensor configured to detect an obstacle around a vehicle;
a memory configured to store a stopped-vehicle movement range;
a brake driving controller configured to turn on or off a vehicle brake; and
a processor configured to:
cause the vehicle to move by transmitting a control signal to a controller of the vehicle,
provide a stopped-vehicle movement mode in which the vehicle is permitted to move by an external force applied to the vehicle or an auxiliary power source of the vehicle when a driver is not in the vehicle in a state in which the vehicle is stopped and an ignition is off, and
control the brake driving controller to turn off the vehicle brake and maintain the vehicle in a neutral gear when the stopped-vehicle movement mode is executed, and
control the brake driving controller to turn on the vehicle brake based on at least one of an obstacle detected around the vehicle and the stopped-vehicle movement range in the stopped-vehicle movement mode.

24. A method of providing a stopped-vehicle movement mode in which a vehicle moves when a driver is not in the vehicle, the method comprising:

stopping the vehicle by activation of a vehicle brake;

setting a stopped-vehicle movement range;

executing the stopped-vehicle movement mode in a state in which the vehicle is stopped and an ignition is off;

releasing the vehicle brake and maintaining the vehicle in a neutral gear when the stopped-vehicle movement mode is executed;

sensing movement of the vehicle by an external force applied to the vehicle or an auxiliary power source of the vehicle;

sensing an obstacle from a movement direction of the vehicle; and activating the vehicle brake when either the obstacle is sensed or a position of the vehicle reaches a limit of the stopped-vehicle movement range.

25. The method according to claim 24, further comprising:

providing a movement key to control the movement of the vehicle, and moving the vehicle according to an input of the movement key.

26. The method according to claim 24, further comprising moving the vehicle through a mobile terminal of a user.

27. The method according to claim 24, further comprising:

receiving a request for movement of the vehicle;

moving the vehicle by executing the stopped-vehicle movement mode;

scanning a parking space after the vehicle is moved; and performing automatic parking of the vehicle into the scanned parking space.

* * * * *